United States Patent
Sato

(10) Patent No.: US 9,653,197 B2
(45) Date of Patent: May 16, 2017

(54) WIRE HARNESS, WIRE HARNESS MANUFACTURING METHOD AND WIRE HARNESS MANUFACTURING APPARATUS

(71) Applicants: AUTONETWORK TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventor: Osamu Sato, Yokkaichi (JP)

(73) Assignees: AUTONETWORK TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-Shi, Osaka (JP)

(*) Notice: Subject to any disclaimer, the term of this patent is extended or adjusted under 35 U.S.C. 154(b) by 449 days.

(21) Appl. No.: 14/304,232

(22) Filed: Jun. 13, 2014

(65) Prior Publication Data

US 2014/0295067 A1 Oct. 2, 2014

Related U.S. Application Data

(62) Division of application No. 13/500,086, filed as application No. PCT/JP2011/052811 on Feb. 10, 2011, now Pat. No. 9,613,732.

(51) Int. Cl.
*B29C 47/02* (2006.01)
*H01B 13/00* (2006.01)
(Continued)

(52) U.S. Cl.
CPC .......... *H01B 13/0013* (2013.01); *B05D 7/20* (2013.01); *B29C 47/003* (2013.01);
(Continued)

(58) Field of Classification Search
CPC .......... B05D 7/20; B29C 47/025; H01B 13/24
See application file for complete search history.

(56) References Cited

U.S. PATENT DOCUMENTS 2,820,249 A  1/1958  Colombo
4,167,305 A  9/1979  Ichiba et al.
(Continued)

FOREIGN PATENT DOCUMENTS

JP   3-126309   5/1991
JP   3-138819   6/1991
(Continued)

OTHER PUBLICATIONS

Chinese Patent Appl. No. 201180018574.6—Office Action issued Sep. 7, 2015.
(Continued)

*Primary Examiner* — James Sanders
(74) *Attorney, Agent, or Firm* — Gerald E. Hespos; Michael J. Porco; Matthew T. Hespos

(57) ABSTRACT

A wire harness manufacturing method prevents inadvertent deformation of thermoplastic material and separation of thermoplastic material. A predetermined part of an electric wire 91 is accommodated in a through hole of a tubular body formed by connection between a first and second nest members (123, 124) of a nozzle (12), by integrally connecting first and second case body members (121, 122) of the nozzle (12), with the predetermined part of the electric wire 91 therebetween. An approximately tubular covering member (92) covering the predetermined part of the electric wire (91) is molded integrally with the thermoplastic material, by (Continued)

discharging thermoplastic material plasticized by a material plasticizing unit (11) from thermoplastic material discharge orifices (1213) and (1223) in the nozzle (12) to the outer periphery of the electric wire (91), while moving the electric wire (91) and the nozzle (12) relatively to each other.

4 Claims, 18 Drawing Sheets

(51) Int. Cl.
| | |
|---|---|
| *B29C 47/08* | (2006.01) |
| *B29C 47/88* | (2006.01) |
| *H01B 13/24* | (2006.01) |
| *H01B 13/012* | (2006.01) |
| *B05D 7/20* | (2006.01) |
| *H01B 7/00* | (2006.01) |
| *B29C 47/00* | (2006.01) |
| *B29C 47/20* | (2006.01) |
| *B29C 47/90* | (2006.01) |

(52) U.S. Cl.
CPC ........ *B29C 47/0016* (2013.01); *B29C 47/025* (2013.01); *B29C 47/0828* (2013.01); *B29C 47/8805* (2013.01); *B29C 47/8815* (2013.01); *H01B 7/0045* (2013.01); *H01B 13/01263* (2013.01); *H01B 13/24* (2013.01); *B29C 47/20* (2013.01); *B29C 47/908* (2013.01)

(56) References Cited

U.S. PATENT DOCUMENTS

| | | |
|---|---|---|
| 4,699,579 A | 10/1987 | Bourdon et al. |
| 5,259,746 A | 11/1993 | Minuado |
| 7,868,253 B2 | 1/2011 | Sato et al. |
| 2008/0193755 A1 | 8/2008 | Guise et al. |
| 2010/0243291 A1 | 9/2010 | Glew |
| 2011/0303487 A1 | 12/2011 | Caccia |

FOREIGN PATENT DOCUMENTS

| | | |
|---|---|---|
| JP | 8-31474 | 2/1996 |
| JP | 11-238420 | 8/1999 |
| JP | 2000-261939 | 9/2000 |
| JP | 2002-279840 | 9/2002 |
| JP | 2004-14475 | 1/2004 |
| JP | 2005-294132 | 10/2005 |
| JP | 2006-120475 | 5/2006 |
| JP | 2007-68945 | 3/2007 |
| JP | 2007-288895 | 11/2007 |
| JP | 2009-181844 | 8/2009 |
| JP | 2009-289603 | 12/2009 |
| JP | 5348736 | 12/2009 |
| JP | 2010016121 | 1/2010 |
| WO | 2008098175 | 8/2008 |

OTHER PUBLICATIONS

Chinese Patent Appl. No. 201180018574.6—Office Action issued Feb. 10, 2015.

WIRE HARNESS, WIRE HARNESS MANUFACTURING METHOD AND WIRE HARNESS MANUFACTURING APPARATUS

CROSS-REFERENCE TO RELATED APPLICATIONS

This application is a divisional of U.S. patent application Ser. No. 13/500,086 filed on Apr. 4, 2012.

BACKGROUND OF THE INVENTION

1. Field of the Invention

The present invention relates to a wire harness, a wire harness manufacturing method and a wire harness manufacturing apparatus, and more particularly, to a wire harness in which a predetermined part of electric wire is provided with a member having a function of protecting the electric wire and/or a function of bundling plural electric wires, a method for manufacturing the wire harness, and an apparatus capable of manufacturing the wire harness (wire harness manufacturing apparatus).

2. Description of the Related Art

In a vehicle such as an automobile, a wire harness to mutually connect electric devices and electronic devices is arranged. The wire harness used for such application generally has predetermined types and predetermined lengths of plural electric wires. These plural electric wires are bound (or bundled) in a predetermined form. Further, predetermined types of connectors and the like are attached to ends of the respective electric wires included in the wire harness. Then a predetermined part of the wire harness is provided with a member to bind (or bundle) an electric wire group not to unbind the respective electric wires and a member having a function of protecting the electric wire or electric wire group.

As a structure to bind (or bundle) an electric wire group and protect the electric wire(s), a structure to wrap a tape around the predetermined part of an electric wire group, a structure to accommodate the predetermined part of the electric wire group in a tube of resin material or the like (e.g., a corrugate tube), a structure to embed the predetermined part of the electric wire group in a molded resin member (insert molding), a structure to mold a member covering the outer peripheral surface of the predetermined part of the electric wire group using resin material, and the like, are used.

However, these structures may have the following problems.

When a tape is wrapped around the predetermined part of the electric wire group, in the tape-wrapped part, in comparison with the part before the wrapping (or an unwrapped part), the flexibility of the electric wire group (deformability of the electric wire group) is lowered. Accordingly, when the wire harness is arranged in a vehicle or the like, the handleability of the wire harness is lowered. This might reduce working efficiency. In addition, the appearance of the tape-wrapped part is bad.

In the structure where the predetermined part of the electric wire group is accommodated in a tube, the wire harness manufacturing apparatus and/or a manufacturing procedure is limited in accordance with structures of connectors and the like. Generally, predetermined connectors and the like are attached to the ends of the electric wires included in the wire harness. When the electric wires attached to the connectors cannot be passed through the tube (e.g., when the sizes of the connectors and the like are larger than an inner diameter of the tube), it is necessary, as a procedure of the wire harness manufacturing, to first pass the predetermined part of the electric wire group through the tube (accommodate the part in the tube), then, attach the connectors and the like to the ends of the electric wires. When an apparatus to automatically attach connectors and the like to the ends of electric wires may be used, however, when the electric wire group is accommodated in the tube, it is impossible to set the electric wires in such apparatus due to interference with the tube and/or the other electric wires in some cases. In this case, since it is impossible to automatically attach the connectors and the like to the ends of the electric wires, it is necessary to manually attach the connectors or the like. It is difficult to reduce the manufacturing cost of the wire harness.

In the structure using a tube in which a slit is formed, it is necessary to wrap a tape or the like around the outer peripheral surface of the tube to prevent falling of the electric wire or electric wire group. Since the number of process steps is increased, it is difficult to reduce the manufacturing cost. Further, the appearance of the tape-wrapped tube is bad.

Further, the tube used for the wire harness generally lacks a positioning mechanism with respect to the predetermined part of electric wire(s). Accordingly, it is necessary to wrap a tape or the like over the electric wire group and the tube to prevent shift of the tube from the predetermined position of the electric wire group. Accordingly, it is difficult to reduce the number of process steps. Further, the appearance of the wrapped tape is bad.

In the structure where the predetermined part of the electric wire or electric wire group is embedded in a molded part, a molding die (generally a die for injection molding) is required. It is necessary to prepare such molding die for parts in different lengths and diameters. Generally, since a molding die is expensive and is not very versatile, this structure using such molding die might increase the equipment cost.

In the structure to mold a resin part covering the predetermined part of the electric wire or electric wire group, a molding die corresponding to the outer diameter (outer shape) of the electric wire or electric wire group is required. For a reason similar to that in the above structure, the structure might increase the equipment cost. Further, in this structure, it is difficult to change the thickness of the molded part. That is, in some cases, in the member covering the predetermined part of the electric wire or electric wire group, it is desirable to increase the thickness of a part to have a function of protecting the electric wire or electric wire group while reducing the thickness of the other part. However, since the structure is approximately the same as a structure to mold a member to cover a core wire of an electric wire, it is difficult to change the thickness of the member.

In view of the above situation, the present invention has an object to provide a wire harness in which, even when a covering member is molded, the reduction of flexibility (especially bendability) of the part in which the covering member is molded can be prevented or suppressed, a manufacturing apparatus of the wire harness and a method for manufacturing the wire harness. Further, the present invention has another object to provide a wire harness in which the covering member is not shifted, a manufacturing apparatus of the wire harness and a method for manufacturing the wire harness. Further, the present invention has another object to provide a wire harness in which a good-appearance covering member is molded, a manufacturing apparatus of the wire harness and a method for manufacturing the wire harness. Further, the present invention has another object to provide a wire harness having an integrally-formed covering member in which the thickness is changed, a manufacturing apparatus of the wire harness and a method for manufacturing the wire harness. Further, the present invention has another object to provide a wire harness capable of reducing equipment cost and/or manufacturing cost or capable of preventing an increase in the equipment cost and/or manufacturing cost, a manufacturing apparatus of the wire harness and a method for manufacturing the wire harness.

SUMMARY OF THE INVENTION

To achieve the objects and in accordance with the purpose of the present invention, a wire harness according to preferred embodiments of the present invention is prepared wherein a predetermined part of an outer peripheral surface of a single or a plurality of coated electric wires, in which a conductor is coated with a sheath member, is covered with a covering member formed by integrally molding with thermoplastic resin material in an approximately tubular shape, wherein an inner peripheral surface of the tubular-shaped covering member, which is plasticized by thermo plasticity of the thermoplastic material, is directly attached to a part of the outer peripheral surface of the electric wire positioned at the outside of the electric wire bundle, and wherein a gap is formed between the respective electric wires. A thickness of the tubular-shaped covering member may be the same over an entire length in an axial direction of the electric wire, or the thickness may be increased in a middle position. It is possible that the thermoplastic resin material forming the tubular-shaped covering member is polyester hot melt resin.

A wire harness manufacturing apparatus for manufacturing a wire harness having an electric wire and a covering member, molded with thermoplastic material, that covers a predetermined part of the electric wire according to the preferred embodiments of the present invention includes a material plasticizing unit that plasticizes the thermoplastic material to a softened and plastic-deformable state upon reception of an external force, and a nozzle that has a through hole, integrally connectable and separable into plural parts, which can accommodate the predetermined part of the electric wire when integrally connected, and a thermoplastic material discharge orifice which continuously surrounds an outer peripheral surface of one end of the through hole, wherein, when the nozzle is integrally connected, the covering member that covers the predetermined part of the electric wire can be integrally molded with the thermoplastic material, by discharging the thermoplastic material, plasticized by the material plasticizing unit from the thermoplastic material discharge orifice formed in the nozzle, on the outer peripheral surface of the predetermined part of the electric wire projected from one end of the through hole, in a state where the predetermined part of the electric wire is accommodated in the through hole formed in the nozzle.

It is possible that the nozzle has a plurality of nest members mutually integrally connectable and separable that, in the connected state, form a tubular body in which the rough hole is formed, and a plurality of case members, mutually integrally connectable and separable, in which the plurality of nest members can be fitted, wherein when the plurality of case members in which the plurality of nest members are fitted are connected, the plurality of nest members are also connected to form the tubular body, and the through hole in the tubular body formed by connection of the plurality of nest members becomes a through hole that accommodates the predetermined part of the electric wire, and wherein the thermoplastic material discharge orifice is formed on the outer peripheral surface of one end of the tubular body in an axial direction formed by connection of the plurality of nest members.

It is possible that in each of the plurality of nest members, a groove-shaped thermoplastic material channel is formed in a surface which becomes an outer peripheral surface of the tubular body when the plurality of nest members are connected to form the tubular body, and wherein the plasticized resin material is discharged from the thermoplastic material discharge orifice through the groove-shaped thermoplastic material channel.

It is possible that the nozzle has a plurality of tabular members mutually integrally connectable and separable that, in the connected state, form a tabular body in which the through hole is formed, wherein the through hole of the tabular body formed by connection between the plurality of tabular members becomes the through hole that accommodates the predetermined part of the electric wire, and wherein the thermoplastic material discharge orifice is formed in an outer periphery of one end of the through hole in the axial direction in the tabular body formed by connection of the plurality of tabular members.

It is possible that in each of the plurality of tabular members, the groove-shaped thermoplastic material channel, capped with a lid member, is formed in a planar direction of the tabular body, and wherein the plasticized resin material is discharged from the thermoplastic material discharge orifice through the groove-shaped thermoplastic material channel.

It is possible that a plurality of groove-shaped thermoplastic material channels is formed, and a channel cross-sectional area is increased in accordance with increment in channel length to the discharge orifice.

It is preferable that the wire harness manufacturing apparatus according to the preferred embodiments of the present invention further includes an air blowing unit that cools down the covering member molded with the thermoplastic material discharged from the thermoplastic material discharge orifice of the nozzle by sending air to the covering member.

A wire harness manufacturing method according to the preferred embodiments of the present invention includes steps of covering an outer periphery of a predetermined part of a single wire or a bundle of a plurality of electric wires, in which a conductor is coated with a sheath member, with a covering member, formed by integral molding in an approximate tubular shape, by heating thermoplastic resin material to a temperature at which the thermoplastic resin is plastic-deformable and which is lower than a fusing point and discharging the thermoplastic resin material to the outer periphery of the predetermined part from a plurality of directions in a circumferential direction, directly attaching an inner peripheral surface of the tubular-shaped covering member to a part of an outer peripheral surface of the electric wire positioned outside the bundle of electric wires, and forming a gap between the respective electric wires. It is possible that in formation of the tubular shaped covering member by discharging the thermoplastic resin material to the outer periphery of the bundle of electric wires, the bundle of electric wires is relatively moved in an axial direction of the bundle of electric wires with respect to a discharge part of the thermoplastic resin material. Further, it is possible that a thickness of the tubular-shaped covering member is made to be uniform over an entire length or changed in a middle position in the axial direction of the electric wire by controlling a discharge amount of the thermoplastic resin material per unit time or a speed of relative movement of the bundle of electric wires in the axial direction. In addition, it is possible that the thermoplastic resin material forming the tubular-shaped covering member is polyester hot melt resin.

The wire harness manufacturing method according to the preferred embodiments of the present invention using the wire harness manufacturing apparatus according to the invention includes steps of accommodating the predetermined part of the electric wire in the through hole by integrally connecting the nozzle while holding the predetermined part of the electric wire inside, and integrally molding the covering member in the approximate tubular shape covering the predetermined part of the electric wire with the thermoplastic material by discharging the thermoplastic material plasticized by the material plasticizing unit from the thermoplastic material discharge orifice of the nozzle to the outer periphery of the predetermined part of the electric wire while moving the predetermined part of the electric wire and the nozzle relatively to each other.

It is possible that the thickness of the covering member is controlled by controlling the speed of relative movement between the predetermined part of the electric wire and the nozzle and/or the amount of the thermoplastic material discharged from the thermoplastic material discharge orifice of the nozzle per unit time.

It is possible that in the wire harness manufacturing method, the covering member in the approximate tubular shape covering the predetermined part of the electric wire is integrally molded with the thermoplastic material by discharging the thermoplastic material plasticized by the material plasticizing unit to the outer periphery of the predetermined part of the electric wire, and the inner peripheral surface of the covering member and the outer periphery of the predetermined part of the electric wire are attached by plasticity of the thermoplastic material.

The wire harness manufacturing method according to the preferred embodiments of the present invention using the wire harness manufacturing apparatus according to the invention includes steps of molding a covering member of thermoplastic material in the predetermined part of the electric wire by the wire harness manufacturing method according to any one of the above-mentioned method, stopping relative movement between the predetermined part of the electric wire and the nozzle and cooling down the molded covering member by sending air to the covering member from the air blowing unit, and thereafter, cutting the molded covering member and the thermoplastic material existing in the nozzle in a position of the thermoplastic material discharge orifice of the nozzle and separating the covering member from the thermoplastic material, by moving the predetermined part of the electric wire and the nozzle relatively to each other without discharging the thermoplastic material from the thermoplastic material discharge orifice of the nozzle.

In the wire harness according to the present invention, the reduction of the flexibility of a part in which the covering member is molded can be prevented or suppressed. Accordingly, when the wire harness according to the present invention is arranged inside a vehicle or the like, since the predetermined part can be easily deformed, the working efficiency of the arranging can be improved.

As the inner peripheral surface of the covering member is attached to the predetermined part of the electric wire, the covering member is not moved from the predetermined part of the electric wire. Accordingly, no structure or working step to prevent movement of the covering member is necessary. It is possible to reduce the manufacturing cost and the number of process steps.

Further, the appearance of the wire harness is good in comparison with a structure where a tape as a covering member is wrapped around the electric wire.

In the wire harness manufacturing apparatus according to the present invention, it is possible to prevent or suppress the rise of equipment cost or reduce the equipment cost.

That is, for example, the nozzle applied to the wire harness manufacturing apparatus according to the present invention has a simple structure and is manufactured at a low cost in comparison with an injection mold die. That is, the injection mold die requires a structure to resist pressure of injected thermoplastic material. On the other hand, since no high pressure is applied to the nozzle used in the wire harness manufacturing apparatus according to the present invention, the structure to resist high pressure is not required. Accordingly, the nozzle has a simple structure and can be manufactured in a small size.

Further, in general injection molding, a mold clamping mechanism is required so as not to separate upper and lower molds of the molding die due to the pressure of the injected thermoplastic material. Accordingly, the structure of equipment to form the covering member is complicated and is expensive. On the other hand, in the wire harness manufacturing apparatus according to the present invention, even while thermoplastic material is discharged, no force to separate integrally-connected plural casing members is applied. Accordingly, the wire harness manufacturing apparatus according to the present invention does not require a mechanism corresponding to the mold clamping mechanism in the equipment for injection molding.

Further, in general injection molding, it is necessary to apply high pressure to the thermoplastic material to fill thermoplastic material in a mold die. On the other hand, in the structure of the wire harness manufacturing apparatus according to the present invention, it is sufficient to merely apply pressure to the plasticized resin material at a level to discharge (flow) the resin material from a discharge orifice of the nozzle. Accordingly, in comparison with the injection molding, since the pressure applied to the thermoplastic material is low, a small sized device is applicable as a device to feed the thermoplastic material. Further, a thermoplastic material channel (hose or the like connecting a material plasticizing unit with the nozzle) does not require a structure to resist high pressure.

Further, the wire harness manufacturing apparatus according to the present invention has high versatility.

For example, in the structure to form a covering member by injection molding, only one type (one size and one shape) of covering member is molded with a set of mold dies. Accordingly, to form a covering member in which the thickness changes, it is necessary to prepare mold dies for respective thicknesses of the covering member. Similarly, to form a covering member in which the axial directional length changes, it is necessary to prepare mold dies for respective axial directional lengths of the covering member. On the other hand, the nozzle applied to the wire harness manufacturing apparatus according to the present invention can change the thickness of the covering member by controlling the speed of relative movement of the nozzle with respect to a predetermined part of the electric wire and/or controlling the discharge amount of the thermoplastic material per unit time. Accordingly, it is possible with a pair of nozzles to form a covering member in which the thickness changes. Further, it is possible to form a covering member in an appropriate length in the predetermined part of the electric wire by appropriately setting a range of relative movement of the nozzle with respect to the predetermined part of the electric wire.

Further, when the predetermined part of the electric wire has a size to be accommodated in a through hole formed with connected plural nest members, the covering member can be molded regardless of the outer diameter of the predetermined part of the electric wire. Accordingly, it is possible to handle the plural sizes of the electric wire (when plural electric wires are included, the diameter of the electric wire bunch) with the pair of nozzles. Further, even when the diameter of the electric wire changes in the middle of the axial direction, it is possible to integrally mold the covering member over the diameter-change part without discontinuity (or without nozzle change).

Further, as long as the thermoplastic material channel is formed in a planar direction of a tabular plane formed by connection between a first tabular member and a second tabular member, the thickness of the nozzle (size in the axial direction of the electric wire) can be reduced. Accordingly, the covering member can be formed to a position closer to the root (branch point or the like) of the electric wire.

Further, when plural thermoplastic material channels are formed and a long channel has a large cross-sectional area, pressure loss due to line resistances in the respective channels can be approximately uniform. That is, since it is possible to approximately obtain a state as the pressure of the thermoplastic material discharged from the discharge orifice of the nozzle is uniform in a circumferential direction of the electric wire, the thickness of the formed covering member is uniform in the circumferential direction.

In the wire harness manufacturing method according to the present invention, the order of the step of attaching a connector or the like to the end of the electric wire and the step of molding the covering member in the predetermined part of the electric wire is not limited. Accordingly, in the wire harness manufacturing method according to the present invention, it is possible to attach predetermined connectors and the like to the ends of the respective electric wires then bundle the electric wires, and mold the covering member. Accordingly, the step of attaching the connectors and the like to the ends of the electric wires is performed in a state where each electric wire individually exists. Accordingly, at the step of attaching the connectors and the like using a device to automatically attach the connectors and the like, there is no difficulty in setting of the connectors and the like due to interference with other electric wires or covering member. It is therefore possible to perform the step of attaching the connectors and the like to the respective electric wires using the device to automatically attach the connector and the like, and reduce the manufacturing cost.

Further, in the wire harness manufacturing method according to embodiments of the present invention, it is possible to mold a covering member 92 in which the thickness changes along an axial direction (i.e., a covering member in which the strength changes) simply and integrally. More particularly, during molding of the covering member, the thickness of the covering member can be adjusted only by controlling the speed of relative movement of the nozzle with respect to a predetermined part of the electric wire and/or the amount of thermoplastic material discharged from the discharge orifice of the nozzle per unit time. That is, it is possible to integrally mold the covering member in which the thickness changes along the axial direction. Accordingly, as it is not necessary to provide plural covering members, it is possible to reduce the number of process steps. Further, since it is possible to integrally mold the covering member in which the thickness changes along the axial direction with the thermoplastic material, it is possible to reduce the number of parts of the wire harness.

In the wire harness manufacturing method according to the embodiments of the present invention, it is possible to cut the molded covering member at its terminal end without causing plastic deformation of the covering member by pulling it out. Accordingly, the appearance of the covering member in the axial direction can be improved.

When an air blowing unit sends air to the molded covering member, the covering member is quickly cooled down. Accordingly, plastic deformation by thermal plasticity does not occur in the covering member. On the other hand, since the thermoplastic material existing in the nozzle does not receive air sent from the air blowing unit and is not cooled, plastic deformation by thermal plasticity easily occurs. As a result, a border between a part in which the plastic deformation by thermal plasticity does not occur and a part in which the plastic deformation by thermal plasticity easily occurs, is formed in thermoplastic material (including the formed covering member) in the position of the discharge orifice of the nozzle.

In this state, when the nozzle and the predetermined part of the electric wire are relatively moved, the thermoplastic material existing in the nozzle remains in the nozzle by a friction force or the like. On the other hand, in the part (molded covering member) of the thermoplastic material discharged from the discharge orifice of the nozzle, plastic deformation by thermo plasticity does not occur, therefore it is not plastic-deformed even when a pulling force in the axial direction is applied. Accordingly, at the thermoplastic material discharge orifice of the nozzle (i.e., on the border between the thermoplastic-deformable part and the undeformable part), it is possible to cut the molded covering member and the thermoplastic material before molding without causing plastic deformation by pulling out the respective parts.

DETAILED DESCRIPTION OF THE PREFERRED EMBODIMENTS

Hereinbelow, preferred embodiments of the present invention will be described in detail with reference to the drawings.

FIGS. 1A and 1B show a predetermined part (a part in which a covering member 92 is provided) of a wire harness 9 according to the embodiments of the present invention. More particularly, FIG. 1A is an external perspective diagram of the predetermined part of the wire harness 9 according to the embodiments of the present invention. FIG. 1B is a cross-sectional diagram along a line A-A in FIG. 1A, schematically showing a cross-sectional structure of the predetermined part of the wire harness 9 according to the embodiments of the present invention.

The wire harness 9 according to the embodiments of the present invention has plural electric wires 91 in a predetermined length and of a predetermined type. The predetermined number of electric wires 91 are bundled to a predetermined shape as a whole (so as to form a predetermined trunk line or a predetermined branch line). That is, a single electric wire 91 or bundled plural electric wires 91 form a predetermined trunk line or a predetermined branch line in the wire harness 9 according to the embodiments of the present invention. Further, predetermined connectors and the like (not shown) are attached to ends of the respective electric wires. Note that the entire shape and size of the wire harness 9 according to the embodiments of the present invention, and the number, and the type of the electric wires 91 included in the wire harness 9 according to the embodiments of the present invention, and the connectors and the like attached to the ends of the respective electric wires 91, are not particularly limited but appropriately set.

Figure 1:
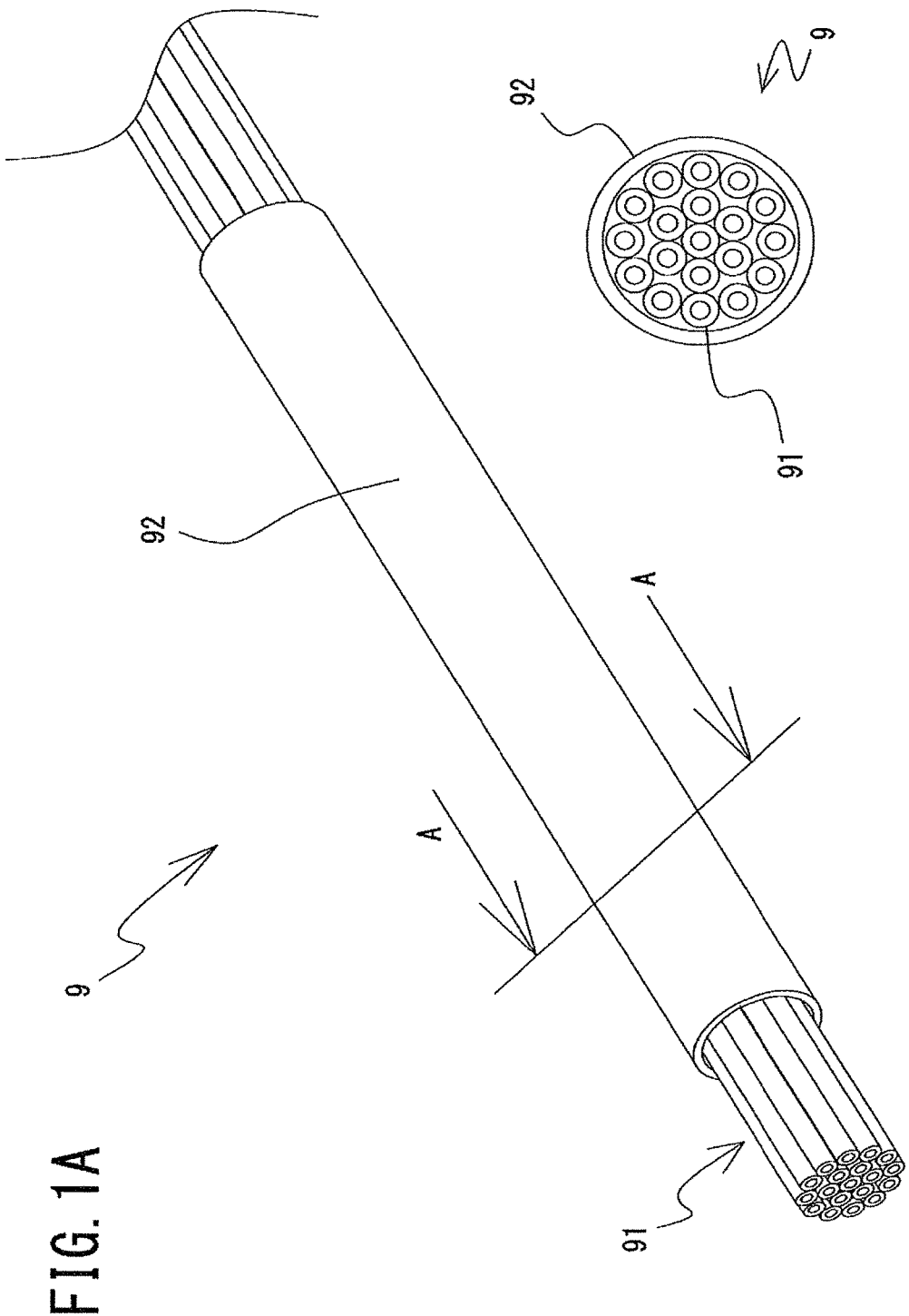
FIG. 1A is an external perspective diagram of a predetermined part (a part in which a cover member is provided) of a wire harness according to embodiments of the present invention.
FIG. 1B is a cross-sectional diagram along a line A-A in FIG. 1A schematically showing a cross-sectional structure of the predetermined part of the wire harness according to the embodiments of the present invention.

As shown in FIGS. 1A and 1B, the predetermined part of the wire harness 9 according to the embodiments of the present invention has a single or plural electric wires 91, and the covering member 92 to cover a single electric wire 91 or the covering member 92 to cover plural electric wires 91 is provided in this part. The covering member 92 has a function of binding plural electric wires 91 (to bundle plural electric wires 91 so as not to unbind them) and a function as a protector to guard the electric wire/wires 91. Note that in FIG. 1, the predetermined part of the wire harness 9 according to the embodiments of the present invention has plural electric wires 91 while it may have a single electric wire 91. The number of the electric wires 91 in the predetermined part of the wire harness 9 according to the embodiments of the present invention is not particularly limited. Further, in the present invention, the "electric wire" 91 has a meaning of single electric wire and a meaning of plural electric wires unless it is specifically defined.

The covering member 92 is a member molded in an approximate tubular shape having a hollow inside, which is formed so as to cover the outer peripheral surface of the electric wires 91 (in other words, it is formed so as to accommodate the electric wires 91 inside). The covering member 92 is easily deformable (as the deformation is not the plastic deformation, the original shape can be restored) with human force. Further, the covering member 92 is not easily plastic-deformed at an environmental temperature when the use of the wire harness 9 according to the embodiments of the present invention is presumed.

In the covering member 92, a part of its inner peripheral surface is attached to the electric wire 91. When the predetermined part of the wire harness 9 according to the embodiments of the present invention includes plural electric wires 91, the part of the inner peripheral surface of the covering member 92 is attached to some or all the plural electric wires 91. The covering member 92 is molded so as to cover the outer periphery of the electric wires 91 included in the predetermined part of the wire harness 9 according to the embodiments of the present invention. Accordingly, as long as a single or a small number of electric wires 91 (two to four, the number differs in accordance with the form of the bundled electric wires 91) are included in the predetermined part, a part of the outer peripheral surfaces all the electric wires 91 is in contact with the inner peripheral surface of the covering member 92, thus all the electric wires 91 are attached to the inner peripheral surface of the covering member 92.

Note that when a large number of electric wires 91 are included in the predetermined part, when these many electric wires 91 are bundled (a bunch of electric wires 91), an electric wire 91 surrounded by other electric wires 91 and not exposed to the outside of the bundle of the electric wires 91 may exist. Such electric wire 91, not in contact with the inner peripheral surface of the covering member 92, is not attached to the covering member. In other words, among the bundled electric wires 91, a part of an exposed part (not a part facing other electric wires 91) in the outer peripheral surface positioned in the outermost side is attached to the inner peripheral surface of the covering member 92. In this manner, a part of the inner peripheral surface of the covering member 92 is attached to the electric wires 91. However, the part of the inner peripheral surface of the covering member 92 is not always attached to all the electric wires 91.

The covering member 92, of thermoplastic material, is molded by utilizing thermo plasticity of the thermoplastic material. The covering member 92 is integrally molded using the thermoplastic material, but not molded by combining (joining) plural parts, and no "seam" or the like of the thermoplastic material is formed in the covering member 92. As the thermoplastic material, various thermoplastic resin materials are applicable. For example, polyester hot melt resin is applicable.

The thickness of the covering member 92 is not particularly limited but it is appropriately set in correspondence with function and the level of the function to be provided in the covering member 92. For example, when the covering member 92 is provided with the function as a protector to guard the electric wire 91, the thickness of the covering member 92 is increased to have high strength not to damage the electric wire 91. On the other hand, when the covering member 92 is provided with only the function of holding the electric wires, the covering member has a thickness merely to obtain sufficient strength to bundle the electric wires. In this way, the thickness of the covering member 92 can be appropriately set.

Figure 2:
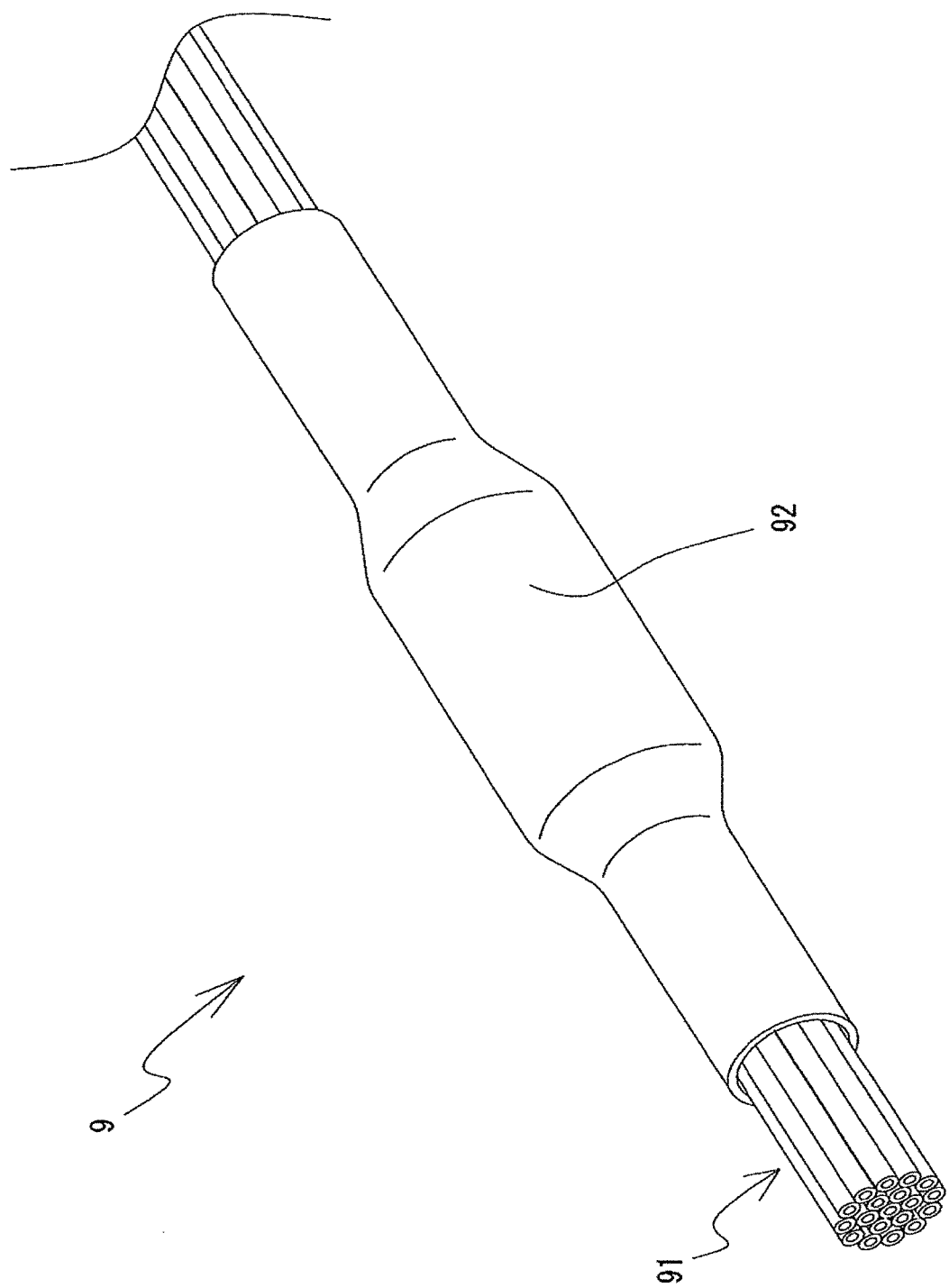
FIG. 2 is an external perspective diagram of the predetermined part of the wire harness according to the embodiments of the present invention, in which the thickness of the covering member changes along an axial direction.

FIG. 2 is an external perspective diagram of the predetermined part of the wire harness 9 according to the embodiments of the present invention, in which the thickness of the covering member 92 is changed along the axial direction. As shown in FIG. 1, the covering member 92 may have a thickness approximately uniform over the entire length along the axial direction, or may have a thickness which changes along the axial direction. For example, in the covering member molded in the predetermined part of the wire harness according to the embodiments of the present invention, the thickness in a position where protection of the electric wire is to be enhanced can be increased. Further, the thickness of the covering member 92 may be different in accordance with required level of protection for the electric wire 91. In this way, the thickness of the covering member 92 is appropriately set in correspondence with function or the like required of the covering member.

Note that the covering member 92 having a thickness approximately uniform over the entire length in the axial direction and the covering member 92 having a thickness which changes along the axial direction are integrally molded using thermoplastic material. That is, for example, in the covering member having a thickness which changes along the axial direction, in place of a structure where another part is attached to a thin part to increase the thickness or a structure where tubular-shaped members having different thicknesses are connected along the axial direction, a structure where a thick part and a thin part are integrally molded as a whole is used.

Next, a wire harness manufacturing apparatus 1 according to a first embodiment of the present invention will be described.

Figure 3:
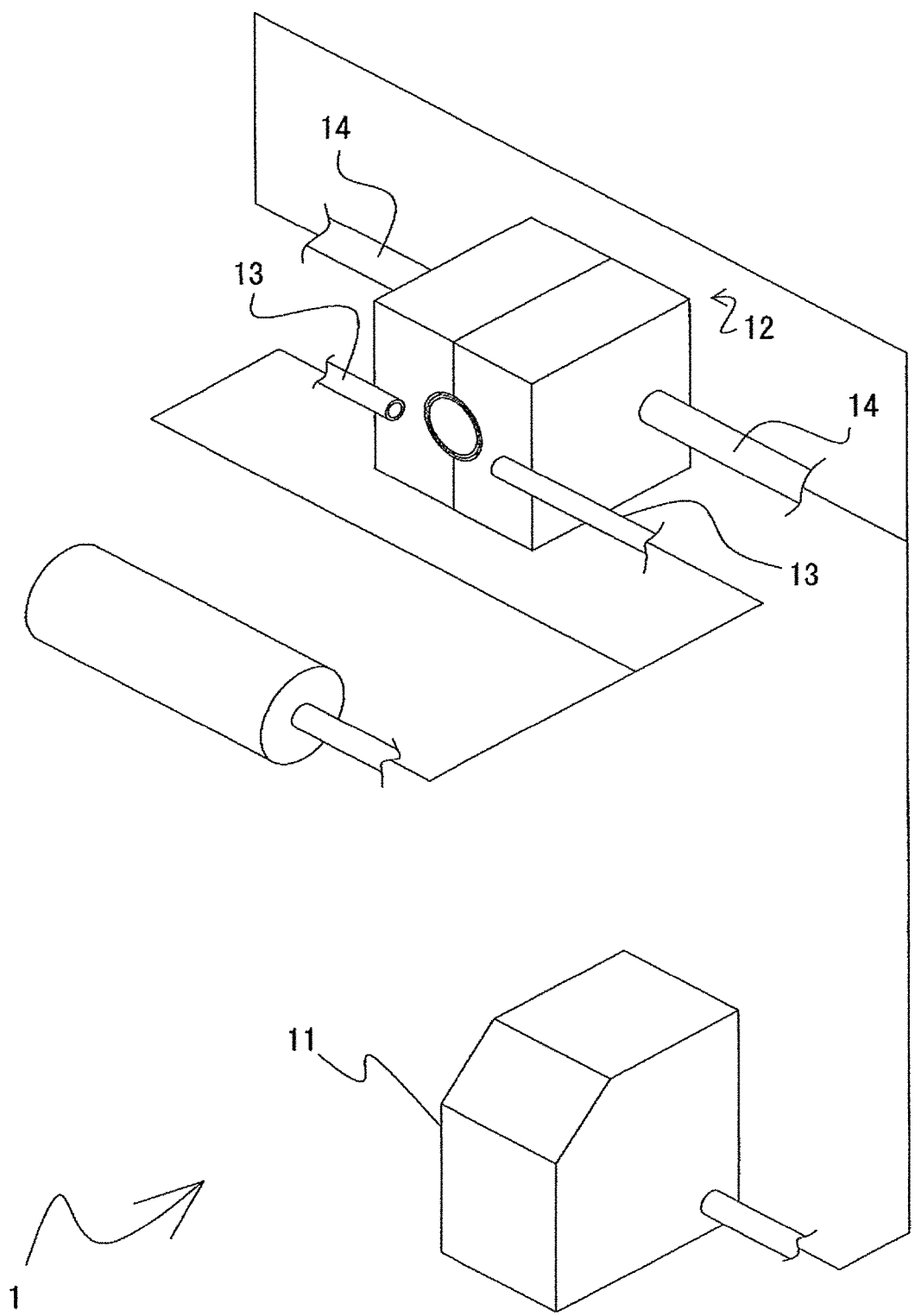
FIG. 3 is a schematic diagram showing principal elements in the structure of a wire harness manufacturing apparatus according to a first embodiment of the present invention.

FIG. 3 is a schematic diagram showing principal elements in the structure of the wire harness manufacturing apparatus 1 according to the first embodiment of the present invention. As shown in FIG. 3, the wire harness manufacturing apparatus 1 according to the first embodiment of the present invention has a material plasticizing unit 11, a nozzle 12, and an air blowing unit 13. The wire harness manufacturing apparatus 1 according to the first embodiment of the present invention molds the covering member 92 so as to cover the electric wire 91 by heat-plasticizing thermoplastic material as the material of the covering member by the material plasticizing unit 11 and feeding the material through a hose (member as a channel of the thermoplastic material) 14 or the like to the nozzle 12, and discharging the plasticized thermoplastic material from the nozzle 12. Further, the air blowing unit 13 cools down the thermoplastic material discharged from the nozzle 12 (molded covering member 92) by sending air to the material.

In this manner, in manufacture of the wire harness 9 according to the embodiments of the present invention, the wire harness manufacturing apparatus 1 according to the first embodiment of the present invention molds the covering member in a predetermined part of the electric wire 91 in the wire harness 9 according to the embodiments of the present invention. Accordingly, it is also a "wire harness (or electric wire) covering member molding apparatus".

The material plasticizing unit 11 is a tool to heat and plasticize the thermoplastic material, and feed the plasticized material to the nozzle 12. Conventionally, various material plasticizing units are applicable as the material plasticizing unit 11. For example, a known general heating device used in resin material injection molding to heat and plasticize resin material is applicable. Accordingly, the explanation of the material plasticizing unit 11 will be omitted.

The heating temperature to heat the thermoplastic material by the material plasticizing unit 11 is set to a temperature at which the thermoplastic material is in a plastically-deformable state (fluidal state, gel state) and the plasticized thermoplastic materials, when in contact, are connected and integrated. Note that at that temperature, the material is plastically deformable by thermo plasticity, and the temperature is lower than a fusing point and lower than a heating temperature (particularly a temperature recommended by thermoplastic material makers) in general molding process (e.g., general injection molding or press molding) for the thermoplastic material. For example, a temperature around a lower limit of a temperature range in which the thermoplastic material is plastically deformable by thermo plasticity is used.

When polyester hot melt resin is applied as the thermoplastic material, as the temperature of heating by the material plasticizing unit, a temperature within the range of 110° C. to 150° C. is applied. The fusing point of the polyester hot melt resin is about 190° C. In general injection molding, the polyester hot melt resin is heated to 190° C. to 210° C.

Figure 4:
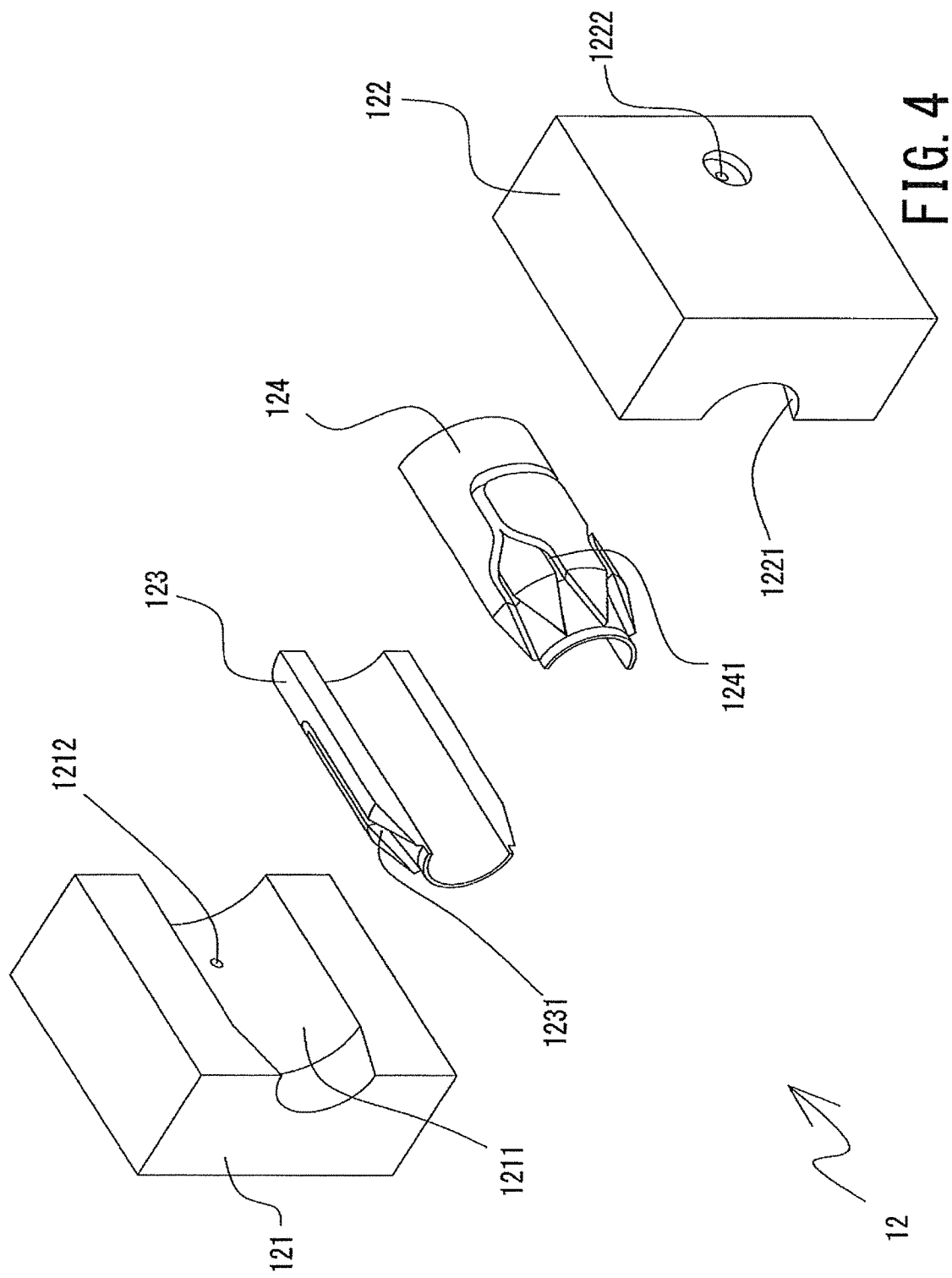
FIG. 4 is an exploded external perspective diagram schematically showing the structures of respective elements of a nozzle of the wire harness manufacturing apparatus according to the first embodiment of the present invention.
Figure 5:
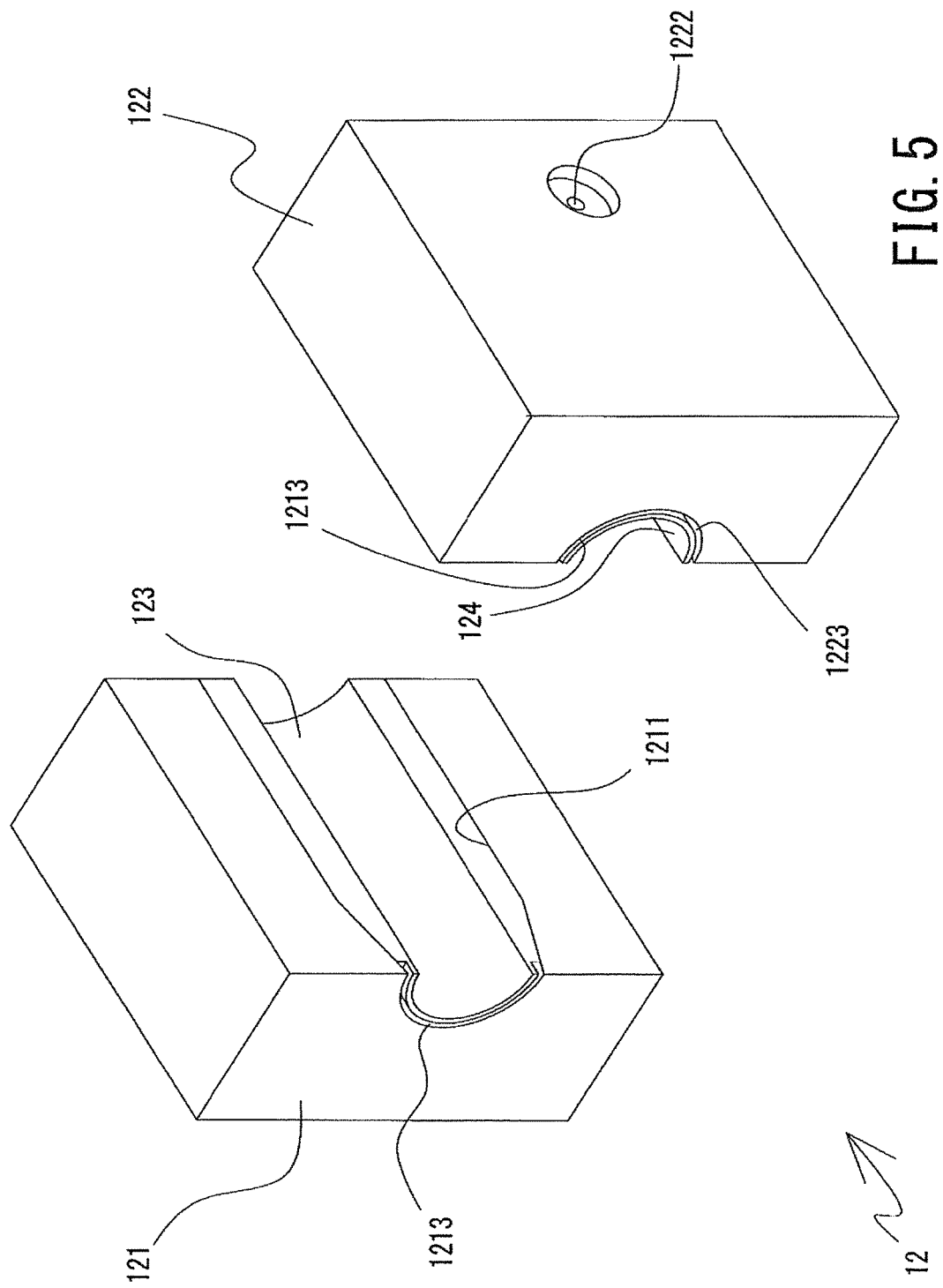
FIG. 5 is an external perspective diagram of the nozzle built in the wire harness manufacturing apparatus according to the first embodiment of the present invention showing a state where a first case body member and a second case body member are separated.
Figure 6:
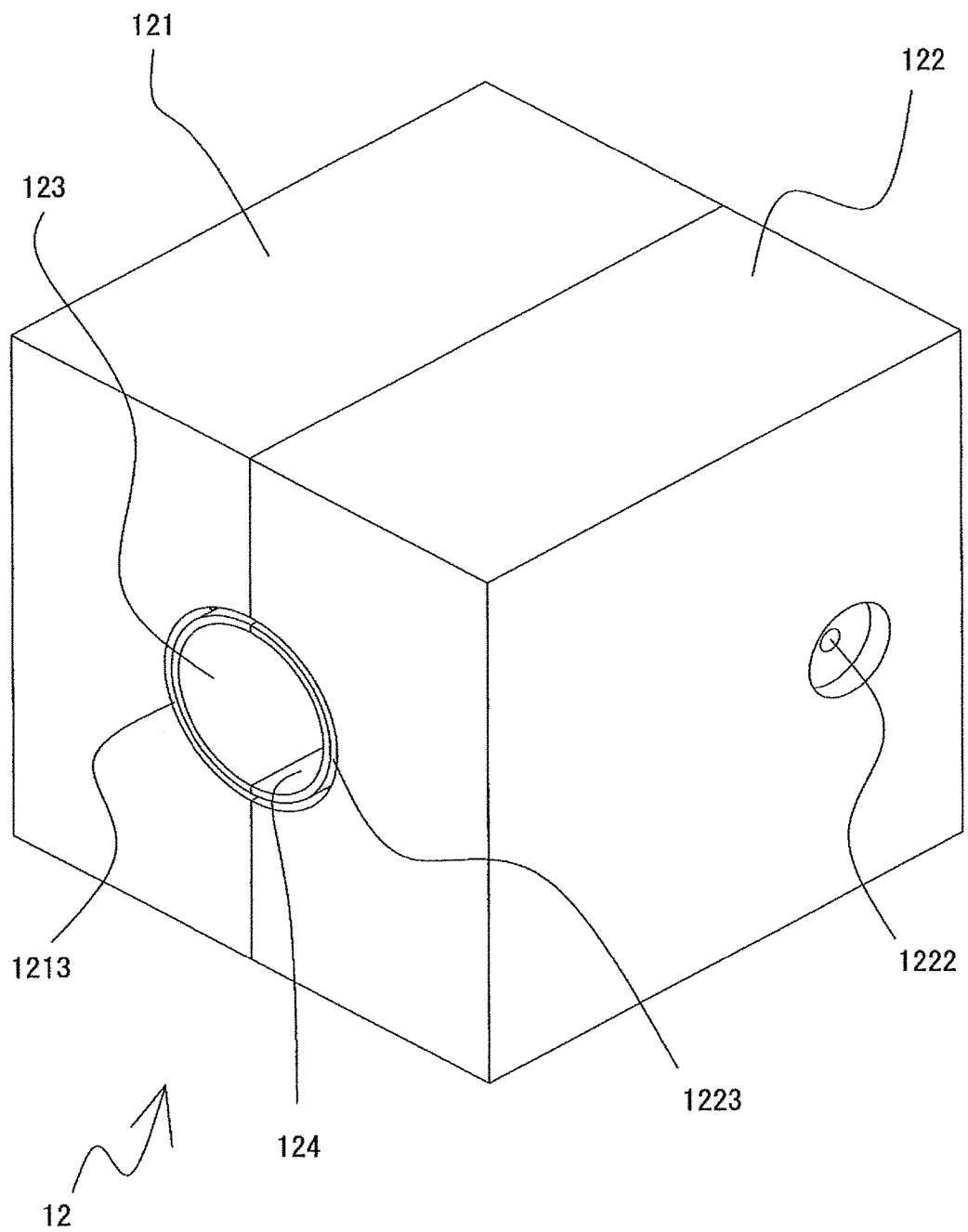
FIG. 6 is an external perspective diagram of the nozzle built in the wire harness manufacturing apparatus according to the first embodiment of the present invention showing a state where the first case body member and the second case body member are connected.

The nozzle 12 is a tool to mold the covering member 92 by discharging the thermoplastic material plasticized by the material plasticizing unit 11 so as to cover the periphery of the electric wire 91 in the wire harness 9. FIG. 4 is an exploded external perspective diagram schematically showing respective elements in the structure of a nozzle 12. FIGS. 5 and 6 are external perspective diagrams of the built nozzle 12. FIG. 5 shows a state where a first case body member 121 and a second case body member 122 are separated. FIG. 6 shows a state where the first case body member 121 and the second case body member 122 are connected.

As shown in FIG. 4, the nozzle 12 has the first case body member 121, the second case body member 122, a first nest member 123 and a second nest member 124. As shown in respective FIGS. 5 and 6, the first nest member 123 is fitted in the first case body member 121, and the second nest member 124 is fitted in the second case body member 122. The first case body member 121 in which the first nest member 123 is fitted and the second case body member 122 in which the second nest member 124 is fitted can be separably connected. In the first case body member 121 in which the first nest member 123 is fitted and the second case body member 122 in which the second nest member 124 is fitted, thermoplastic material discharge orifices (hereinbelow, simply referred to as "discharge orifices") 1213 and 1223 are formed. When the first case body member 121 in which the first nest member 123 is fitted and the second case body member 122 in which the second nest member 124 is fitted are connected, the discharge orifices 1213 and 1223 are integrated. The approximately tubular-shaped covering member 92 is formed by discharging the plasticized thermoplastic material from the discharge orifices 1213 and 1223.

The first nest member 123 and the second nest member 124 can be separably connected. When the first nest member 123 and the second nest member 124 are connected, one tubular body (a structure having a predetermined length in the axial direction and a through hole formed from one end to the other end in the axial direction) is constituted. The first nest member 123 and the second nest member 124 have structures as if they are obtained by dividing a tubular body into halves along the axial direction.

The first nest member 123 and the second nest member 124 are connected, with the electric wire 91 included in the predetermined part of the wire harness 9 according to the embodiments of the present invention, therebetween. That is, the tubular body formed by the connection between the first nest member 123 and the second nest member 124 accommodates (in other words, the electric wire 91 can be inserted through) the electric wire 91 included in the predetermined part of the wire harness 9 according to the embodiments of the present invention. In a state where the electric wire 91 included in the predetermined part of the wire harness 9 according to the embodiments of the present invention is accommodated in the through hole of the tubular body formed by the connection between the first nest member 123 and the second nest member 124, the tubular body formed by the connection between the first nest member 123 and the second nest member 124 and the electric wire 91 included in the predetermined part of the wire harness 9 according to the embodiments of the present invention can relatively move along their axial direction.

Accordingly, the through hole of the tubular body formed by the connection between the first nest member 123 and the second nest member 124 has a shape and a size to accommodate the electric wire 91 included in the predetermined part of the wire harness 9 according to the embodiments of the present invention. Further, the cross-sectional size and shape of the tubular body formed by the connection between the first nest member 123 and the second nest member 124 define the cross-sectional size and shape of the covering member 92. Further, when plural electric wires 91 are included in the predetermined part of the wire harness 9 according to the embodiments of the present invention, the cross-sectional size and shape of the tubular body define the cross-sectional shape of a bundle of electric wires 91. When the cross-sectional shape of the covering member 92 is an approximate circular shape and plural electric wires 91 are bundled so as to have an approximately circular cross-sectional shape, the cross-sectional shape of the tubular body formed by the connection between the first nest member 123 and the second nest member 124 is an approximate circular shape. In this case, the first nest member 123 and the second nest member 124 are respectively a member having an approximately circular cross-sectional shape and a predetermined length.

Note that in the present embodiment, the cross-sectional shape of the tubular body formed by the connection between the first nest member 123 and the second nest member 124 is an approximately circular shape. However, the cross-sectional shape of the tubular body is not particularly limited. For example, it may be a polygonal shape such as a rectangular shape. That is, it is appropriately set in correspondence with the cross-sectional shape of the covering member 92 and the cross-sectional shape of the bundled electric wires 91.

The shape of the outer peripheral surface of the tubular body formed by the connection between the first nest member 123 and the second nest member 124 is not particularly limited. For example, as shown in respective FIGS. 4 to 6, it may be formed to approximately the same cross-sectional shape to the cross-sectional shape of the through hole (approximately circular shape in the present embodiment) or to another shape. That is, it may be arranged such that the cross-sectional shape of the tubular body formed by the connection between the first nest member 123 and the second nest member 124 is an approximately circular shape and the cross-sectional shape of the outer peripheral surface is a polygonal shape (rectangular shape, hexagonal shape or the like).

Note that thermoplastic material channels 1231 and 1241 are formed in the outer peripheral surface of the tubular body formed by the connection between the first nest member 123 and the second nest member 124. The end points of the thermoplastic material channels 1231 and 1241 are formed at one end of the tubular body in the axial direction and in the vicinity of the inner peripheral surface of the through hole (in a position closest to the outside of the through hole) (to be described later). Accordingly, it is preferable that the cross-sectional shape of the outer peripheral surface of the tubular body formed by the connection between the first nest member 123 and the second nest member 124 is approximately the same as the cross-sectional shape of the through hole. That is, the cross-sectional shape of the tubular body formed by the connection between the first nest member 123 and the second nest member 124 has an approximately uniform thickness over the entire periphery in the circumferential direction.

A part around one end of the tubular body formed by the connection between the first nest member 123 and the second nest member 124 in the axial direction is formed to a thin-nose shape in which the cross-sectional size is gradually reduced toward the one end in the axial direction. For example, when the cross-sectional shape of the outer peripheral surface of the tubular body formed by the connection between the first nest member 123 and the second nest member 124 is an approximate circular shape, the part around the one end in the axial direction is formed to a shape like a sliced piece cut from a cone thinned toward the end.

Figure 7A:
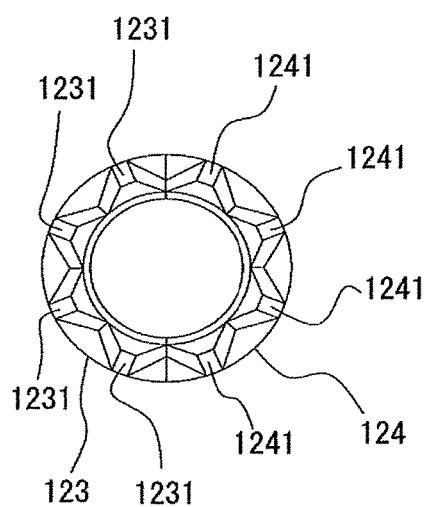
FIG. 7A is a schematic diagram showing the structure of thermoplastic material channels respectively formed in a first nest member and a second nest member of the wire harness manufacturing apparatus according to the first embodiment of the present invention, viewed from one end of the axial direction.
Figure 7B:
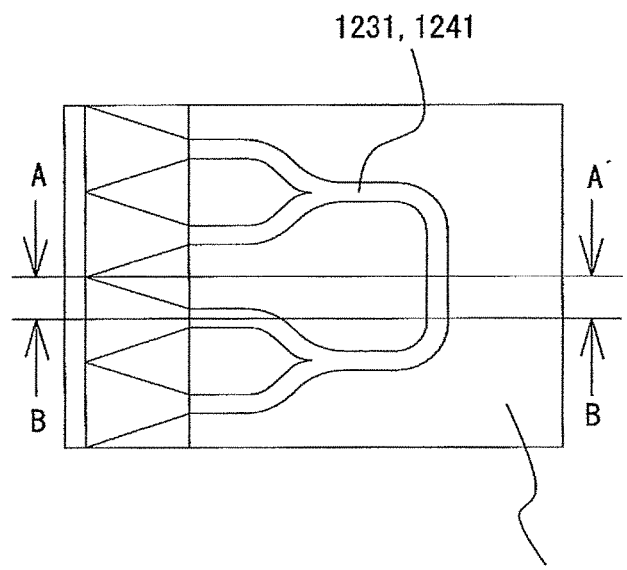
FIG. 7B is a plane diagram showing the thermoplastic material channels formed in the respective outer peripheral surfaces of the first nest member and the second nest member.
Figure 7C:
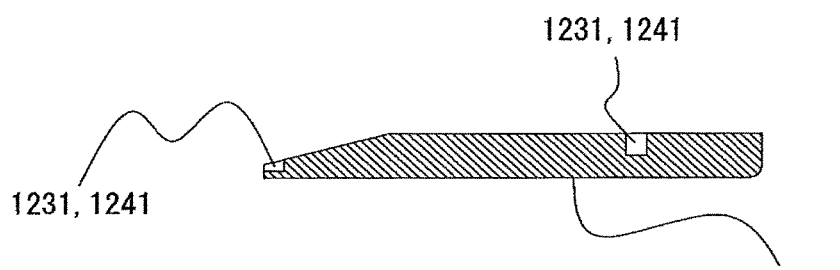
FIG. 7C is a cross-sectional diagram along a line A-A in FIG. 7B.
Figure 7D:
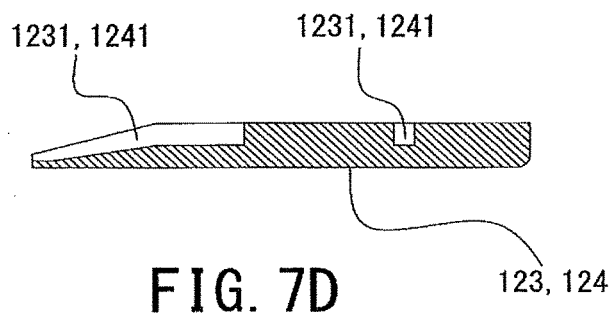
FIG. 7D is a cross-sectional diagram along a line B-B in FIG. 7B.

In the first nest member 123 and the second nest member 124, the thermoplastic material channels 1231 and 1241 are formed. FIGS. 7A to 7D show the structure of the thermoplastic material channels 1231 and 1241 formed in the respective first nest member 123 and the second nest member 124. More particularly, FIG. 7A is a schematic diagram showing the structure of the first nest member 123 and the second nest member 124, viewed from one end of the axial direction. FIG. 7B is a plane diagram of the (thermoplastic material channels 1231 and 1241 formed in) the respective outer peripheral surfaces of the first nest member and the second nest member. FIG. 7C is a cross-sectional diagram along a line A-A in FIG. 7B. FIG. 7D is a cross-sectional diagram along a line B-B in FIG. 7B.

As shown in FIGS. 7A to 7D, the thermoplastic material channels 1231 and 1241 are grooves formed in the respective outer peripheral surfaces of the first nest member 123 and the second nest member 124. As particularly shown in FIG. 7B, in the respective outer peripheral surfaces of the first nest member 123 and the second nest member 124, the thermoplastic material channels 1231 and 1241 have a predetermined position in the middle in the axial direction as a start point and the one end in the axial direction as an end point (arrive at one end in the axial direction). In other words, the one ends of the first nest member 123 and the second nest member 124 in the respective axial directions are the end points of the thermoplastic material channels 1231 and 1241.

The thermoplastic material channels 1231 and 1241 branch into plural channels between the start points to the end points. The branched respective plural thermoplastic material channels 1231 and 1241 extend toward the ends of the first nest member 123 and the second nest member 124 in the respective axial directions. The respective thermoplastic material channels 1231 and 1241 are formed in a horn shape in which the width is gradually widened toward the end in the axial direction in the vicinity of one ends of the first nest member 123 and the second nest member 124 in the respective axial directions. Further, in the horn-shaped part, the bottom surface gradually approaches the inner peripheral surface (i.e., the thickness of the parts around the one ends of the first nest member 123 and the second nest member 124 in the axial direction is thinned toward the ends in the axial direction).

Then the branched respective thermoplastic material channels 1231 and 1241 are all joined and integrated in the position closest to the one ends in the respective axial direction in the first nest member 123 and the second nest member 124 (position closest to the end points). That is, the outer peripheral surface sides at one ends of the first nest member 123 and the second nest member 124 in the axial direction become the thermoplastic material channels 1231 and 1241 over the entire length in the circumferential direction.

When the first nest member 123 and the second nest member 124 are connected, the thermoplastic material channels 1231 and 1241 formed in the first nest member 123 and the second nest member 124 are joined in the position closest to the one end in the axial direction. Accordingly, the tubular body formed by the connection between the first nest member 123 and the second nest member 124 has a structure where the thermoplastic material channels 1231 and 1241 continuously surround over the entire outer peripheral surface at one end of the through hole. Further, as described above, since the bottom surfaces of the thermoplastic material channels 1231 and 1241 are close to the inner peripheral surface in the vicinity of the one end in the axial direction, (the end points of) the thermoplastic material channels 1231 and 1241 are formed in the vicinity of the position closest to the outside of the through hole of the tubular body formed by the connection between the first nest member 123 and the second nest member 124.

More particularly, as the thermoplastic material channels 1231 and 1241, e.g. the following structure is applicable. The thermoplastic material channels 1231 and 1241 respectively have a predetermined position in the axial direction and approximately in the middle of the circumferential direction as a start point. Then the channels extend from the start point toward the both sides in the circumferential direction, thereafter, turn and extend toward one end side in the axial direction. Then in a position front of the one end in the axial direction, the channels respectively branch into two channels (total four channels). The branched respective thermoplastic material channels 1231 and 1241 further extend toward the one end in the axial direction. Then the branched respective thermoplastic material channels 1231 and 1241 are formed in a horn shape in which the width is gradually widened toward the one end in a part where the outer peripheral surface is thin-nose shaped. Further, in this part, the bottom surfaces of the thermoplastic material channels 1231 and 1241 gradually approach the inner peripheral surface (i.e., the thickness of the first nest member 123 and the second nest member 124 is gradually reduced) toward the one end in the axial direction. Then, the respective thermoplastic material channels formed in a horn shape are all joined and integrated in the position closest to the one end in the axial direction.

Note that the structure of the thermoplastic material channels 1231 and 1241 is not limited to the above-described structure. That is, any structure is applicable as long as in the respective first nest member 123 and the second nest member 124, the thermoplastic material channels 1231 and 1241 have the intermediate position of the outer peripheral surface in the axial direction as the start point, and arrive at one end in the axial direction, and further, the channels are formed over the entire length (entire periphery) at one end in the axial direction.

The first case body member 121 has a structure in which the first nest member 123 is fitted. The second case body member 122 has a structure in which the second nest member 124 is fitted. The first case body member 121 in which the first nest member 123 is fitted and the second case body member 122 in which the second nest member 124 is fitted can be separably connected. Note that when the first case body member and the second case body member, in which the first nest member 123 and the second nest member 124 are respectively fitted, are connected, the first nest member 123 and the second nest member 124 are also connected to form the tubular body.

Then the both ends of the through hole of the tubular body formed by the connection between the first nest member 123 and the second nest member 124 appear in the outer peripheral surface of the connected structure of the first case body member 121 and the second case body member 122. That is, the nozzle 12 in a state where the first case body member 121 and the second case body member 122 are connected, as a whole has a structure to form a through hole which can accommodate the electric wire 91 included in the predetermined part of the wire harness 9 according to the embodiments of the present invention.

Referring to FIGS. 4 and 5, a fitting concave member 1211 in which the first nest member 123 is fitted is formed in the first case body member 121. Similarly, a fitting concave member 1221 in which the second nest member 124 is fitted is formed in the second case body member 122. The inner peripheral surface of the fitting concave member 1211 formed in the first case body member 121 is formed in a shape and size with which the outer peripheral surface of the first nest member 123 (hereinbelow, the surface as the outer peripheral surface of the tubular body formed by the connection between the first nest member 123 and the second nest member 124) is approximately in close contact (except the thermoplastic material channel 1231) when the first nest member 123 is fitted.

Accordingly, the fitting concave member 1211 formed in the first case body member 121 is formed to have approximately the same shape and size as those of the outer peripheral surface of the first nest member 123. Similarly, the inner peripheral surface of the fitting concave member 1221 formed in the second case body member 122 is formed in a shape and a size with which the outer peripheral surface of the second nest member 124 (hereinbelow, the surface as the outer peripheral surface of the tubular body formed by the connection between the first nest member 123 and the second nest member 124) is approximately in close contact (note that except the thermoplastic material channel) when the second nest member 124 is fitted. More particularly, for example, the fitting concave member 1211 formed in the first case body member 121 is formed to have approximately the same shape and size as those of the outer peripheral surface of the first nest member 123, and the fitting concave member 1221 formed in the second case body member 122 is formed to have approximately the same shape and size as those of the outer peripheral surface of the second nest member 124.

Accordingly, when the first nest member 123 is fitted in the first case body member 121, the thermoplastic material channel 1231 formed in the first nest member 123 is capped with the inner peripheral surface of the fitting concave member 1211 formed in the first case body member 121. Similarly, when the second nest member 124 is fitted in the second case body member 122, the thermoplastic material channel 1241 formed in the second nest member 124 is capped with the inner peripheral surface of the fitting concave member 1221 formed in the second case body member 122.

In a state where the first nest member 123 is fitted in the fitting concave member 1211 formed in the first case body member 121, one surface of the outer periphery of the first case body member 121 approximately corresponds with an end surface at one end of the first nest member 123 in the axial direction (end surface on the side of the end point of the thermoplastic material channel 1231). Similarly, in a state where the second nest member 124 is fitted in the fitting concave member 1221 formed in the second case body member 122, one surface of the outer periphery of the second case body member 122 approximately corresponds with an end surface at one end of the second nest member 124 in the axial direction. Accordingly, end surfaces of the first nest member 123 and the second nest member 124 at their one ends in the axial direction are exposed from the one surfaces of the respective outer peripheries of the first case body member and the second case body member.

Then, the outer peripheral surface (the bottom surface of the thermoplastic material channel 1231) in the position closest to the one end of the first nest member 123 in the axial direction and the inner peripheral surface of the fitting concave member 1211 formed in the first case body member 121 are opposite to each other with a predetermined distance therebetween. That is, in one surface of the outer periphery of the first case body member 121, a predetermined gap is formed between the outer peripheral surface of the first nest member 123 and the inner peripheral surface of the fitting concave member 1211 formed in the first case body member 121. Similarly, in one surface of the outer periphery of the second case body member 122, a predetermined gap is formed between the outer peripheral surface of the second nest member 124 and the inner peripheral surface of the fitting concave member 1221 formed in the second case body member 122. These gaps become the discharge orifices 1213 and 1223 (discharge orifices to discharge plasticized thermoplastic material) of the nozzle 12.

The first nest member 123, fitted in the fitting concave member 1211 formed in the first case body member 121, is fixed to the first case body member 121. Similarly, the second nest member 124, fitted in the fitting concave member 1221 formed in the second case body member 122, is fixed to the second case body member 122. The first nest member 123 and the second nest member 124 may be respectively attachable/removable to/from the first case body member 121 and the second case body member 122. However, the first nest member 123 and the second nest member 124 are fixed at least while the wire harness 9 according to the embodiments of the present invention is manufactured. For example, a structure where the first nest member 123 and the second nest member 124 are removably fixed with screws or the like is applicable (not shown).

When the first case body member 121 in which the first nest member 123 is fitted and the second case body member 122 in which the second nest member 124 is fitted are connected, one end of the through hole of the tubular body formed by the connection between the first nest member 123 and the second nest member 124 appears in one surface of the outer periphery of the connected structure of the first case body member 121 and the second case body member 122. Then the discharge orifices 1213 and 1223 are formed to surround the periphery of the one end of the through hole. For example, in a structure where the through hole of the connected structure of the first nest member 123 and the second nest member 124 is formed to have an approximate circular cross-sectional shape, the through hole of the connected structure of the first nest member 123 and the second nest member 124, the end surfaces at one ends of the first nest member 123 and the second nest member 124 in the axial direction, the discharge orifices 1213 and 1223 to discharge thermoplastic material, and the inner peripheral surfaces of the fitting concave members 1211 and 1221 of the first case body member 121 and the second case body member 122 are approximately coaxially arrayed.

Thermoplastic material channels 1212 and 1222 are formed in the respective first case body member 121 and the second case body member 122. The thermoplastic material channels 1212 and 1222 are channels to feed plasticized thermoplastic material to the start points of the thermoplastic material channels formed in the respective first nest member 123 fitted in the first case body member 121 and the second nest member 124 fitted in the second case body member 122. Therefore, for example, the thermoplastic material channel 1212 formed in the first case body member 121 has a through hole shaped structure from the outer periphery of the first case body member 121 to a predetermined position (the start point of the thermoplastic material channel 1231 formed in the fitted first nest member 123) of the inner peripheral surface of the fitting concave member 1211. Similarly, the thermoplastic material channel 1222 formed in the second case body member 122 has a through hole shaped structure from the outer periphery of the second case body member 122 to a predetermined position (the start point of the thermoplastic material channel 1241 formed in the fitted second nest member 124) of the inner peripheral surface of the fitting concave member 1221.

In this structure, when plasticized thermoplastic material is fed to the respective thermoplastic material channels 1212 and 1222 of the first case body member 121 and the second case body member 122, the thermoplastic material is discharged from the discharge orifices 1213 and 1223 through the thermoplastic material channels 1212 and 1222 formed in the respective first case body member 121 and the second case body member 122 and the thermoplastic material channels 1231 and 1241 formed in the respective first nest member 123 and the second nest member 124.

Accordingly, inside the first case body member 121 in which the first nest member 123 is fitted and the second case body member in which the second nest member 124 is fitted, the flow of the thermoplastic material is as follows.

When the plasticized thermoplastic material is fed to the thermoplastic material channels 1212 and 1222 in the first case body member 121 and the second case body member 122, the plasticized thermoplastic material flows through these thermoplastic material channels 1212 and 1222, and arrives at the start points of the thermoplastic material channels 1231 and 1241 formed in the respective first nest member 123 and the second nest member 124. Further, the thermoplastic material flows through the thermoplastic material channels 1231 and 1241 toward the end points (the discharge orifices 1213 and 1223).

When the thermoplastic material flows through the thermoplastic material channels 1231 and 1241 from the start points toward the end points, the thermoplastic material also branches and flows in accordance with the branch form of the thermoplastic material channels 1231 and 1241. The branched thermoplastic material flows are joined and integrated in a position closest to one ends of the connected structure of the first nest member 123 and the second nest member 124 in the axial direction. Then the thermoplastic material, in the integrated state, is discharged from the discharge orifices 1213 and 1223. Since the discharge orifices 1213 and 1223 continuously surround the periphery of the through hole of the tubular body formed by the connection between the first nest member 123 and the second nest member 124, the discharged thermoplastic material is formed in a continuous approximate tubular shape having a cross-sectional shape and size corresponding to the shape and size of the discharge orifices 1213 and 1223.

Note that in the first case body member 121 and the second case body member 122, other elements than the fitting concave members 1211 and 1221 are not particularly limited as long as the flow of air in the vicinity of the discharge orifices 1213 and 1223 is not delayed (the air is easily sent to the thermoplastic material discharged from the discharge orifices 1213 and 1223). For example, as respectively shown in FIGS. 5 and 6, the first case body member 121 and the second case body member 122 may have quadratic prism structures which form a through hole in the axial direction when connected, or may have any other basaltiform shapes than quadratic prism shape having a polygonal cross-sectional shape, or a columnar shape.

Note that the first case body member in which the first nest member 123 is fitted and the second case body member in which the second nest member 124 is fitted are connected so as to connect the first nest member 123 with the second nest member 124 to form a tubular body. Accordingly, it may be arranged such that the first case body member 121 and the second case body member 122 are aligned and connected so as to connect the first nest member 123 with the second nest member 124 to form a tubular body. For example, it may be arranged such that in a state where the first case body member 121 and the second case body member 122 are connected, a projection is formed on one of mutually connected or opposite surfaces, and a concave member is formed in the other surface. In this structure, it is possible to align and connect the first case body member 121 with the second case body member 122 by engagement of the projection formed on one of the first case body member 121 and the second case body member 122 with the concave member formed in the other member.

The air blowing unit 13 cools down the thermoplastic material (formed covering member 92), discharged from the discharge orifices 1213 and 1223 of the first case body member 121 and the second case body member 122 (i.e. the nozzle 12), in a position closest to the discharge orifices 1213 and 1223. Accordingly, the air blowing unit 13 has a structure to send air to the position closest to the discharge orifices 1213 and 1223 of the first case body member 121 and the second case body member 122.

Note that the structure of the air blowing unit 13 is not limited, but various conventionally known air blowing units are applicable. For example, a structure having an air compressor or an air tank and a blast tube or a blower tube, to send air in the air compressor or the air tank toward the discharge orifices 1213 and 1223 of the first case body member 121 and the second case body member 122 through the blast tube or the blower tube (the end on the side to discharge the air in the blast tube or the blower tube is provided in a position closest to the first case body member 121 and the second case body member 122) is applicable as the air blowing unit 13. In addition, a structure where a blower fan (various conventionally known fans are applicable as the blower fan) is provided in the vicinity of the discharge orifices 1213 and 1223 is applicable.

Note that as the air blowing unit 13, any structure is applicable as long as it blows air at normal temperatures, and it is not necessary to provide the structure with an air temperature control mechanism. Further, it is not necessary for the air blowing unit 13 to have a structure to cool down the first case body member 121 and the second case body member 122. That is, any structure is applicable as long as it cools down the thermoplastic material discharged tom the discharge orifices 1213 and 1223 of the first case body member 121 and the second case body member 122 to a temperature at which plastic deformation by thermal plasticity does not occur (or a temperature at which the plastic deformation by thermal plasticity is suppressed). Accordingly, the cooling capability (air blowing capability) of the air blowing unit 13 is sufficient as long as it cools down the thermoplastic material to a temperature at which plastic deformation by thermal plasticity does not occur. A cooling capability to cool the first case body member 121 and the second case body member 122 is not required.

Next, regarding a wire harness manufacturing apparatus 2 according to a second embodiment of the present invention, mainly a difference from the wire harness manufacturing apparatus 1 according to the above-described first embodiment will be described.

Figure 8:
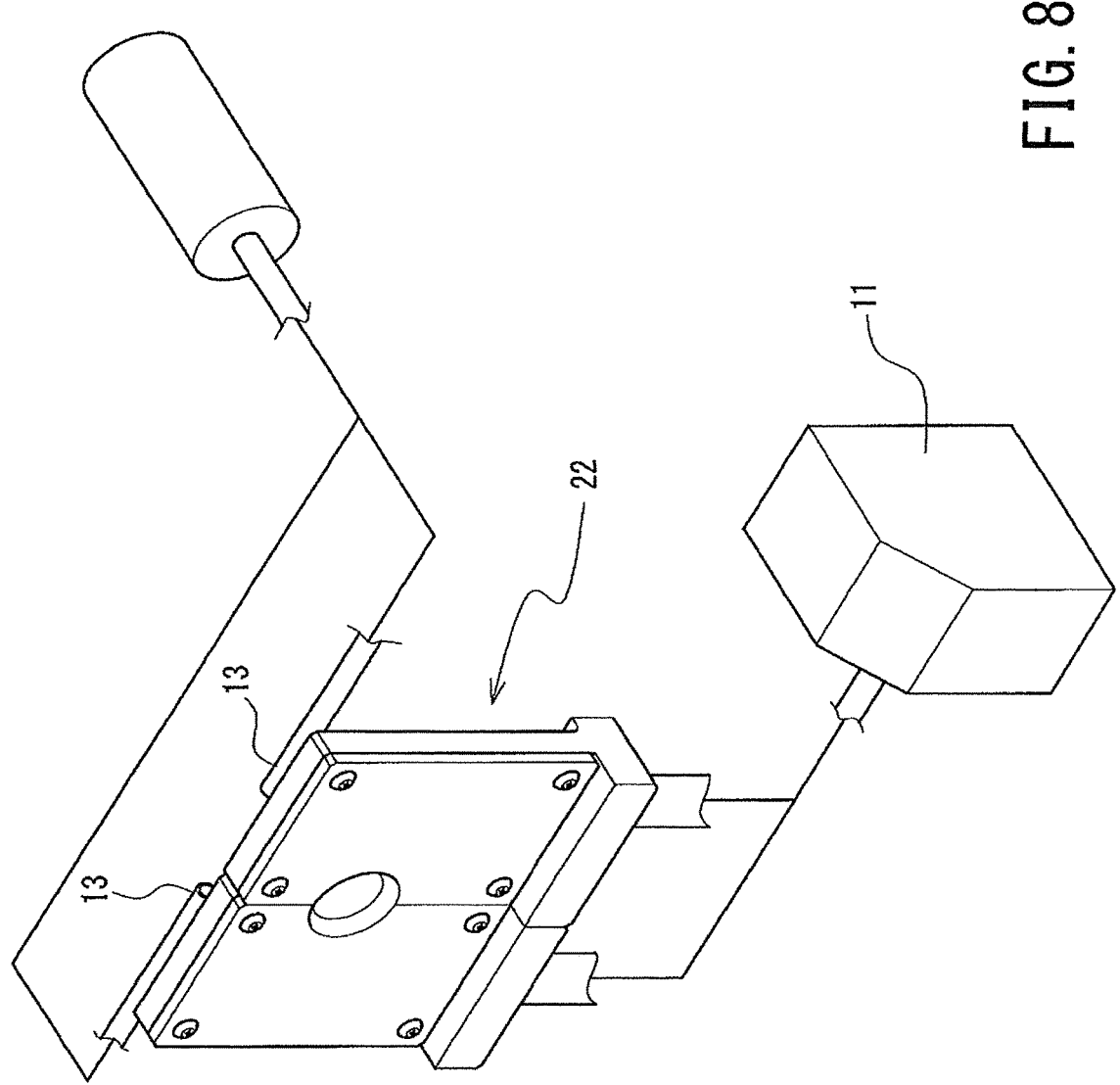
FIG. 8 is a perspective diagram schematically showing the structures of the principal elements of the wire harness manufacturing apparatus according to a second embodiment of the present invention.

FIG. 8 is a perspective diagram schematically showing the structures of principal elements of the wire harness manufacturing apparatus 2 according to the second embodiment of the present invention. As shown in FIG. 8, the wire harness manufacturing apparatus 2 according to the second embodiment of the present invention has the material plasticizing unit 11, a nozzle 22 and an air blowing unit 13. Among these units, the material plasticizing unit 11 and the air blowing unit 13 have the same structures as those in the wire harness manufacturing apparatus 1 according to the first embodiment. That is, the structure of the nozzle 22 in the wire harness manufacturing apparatus 2 according to the second embodiment is different from the nozzle 12 in the wire harness manufacturing apparatus 1 according to the first embodiment.

Figure 9:
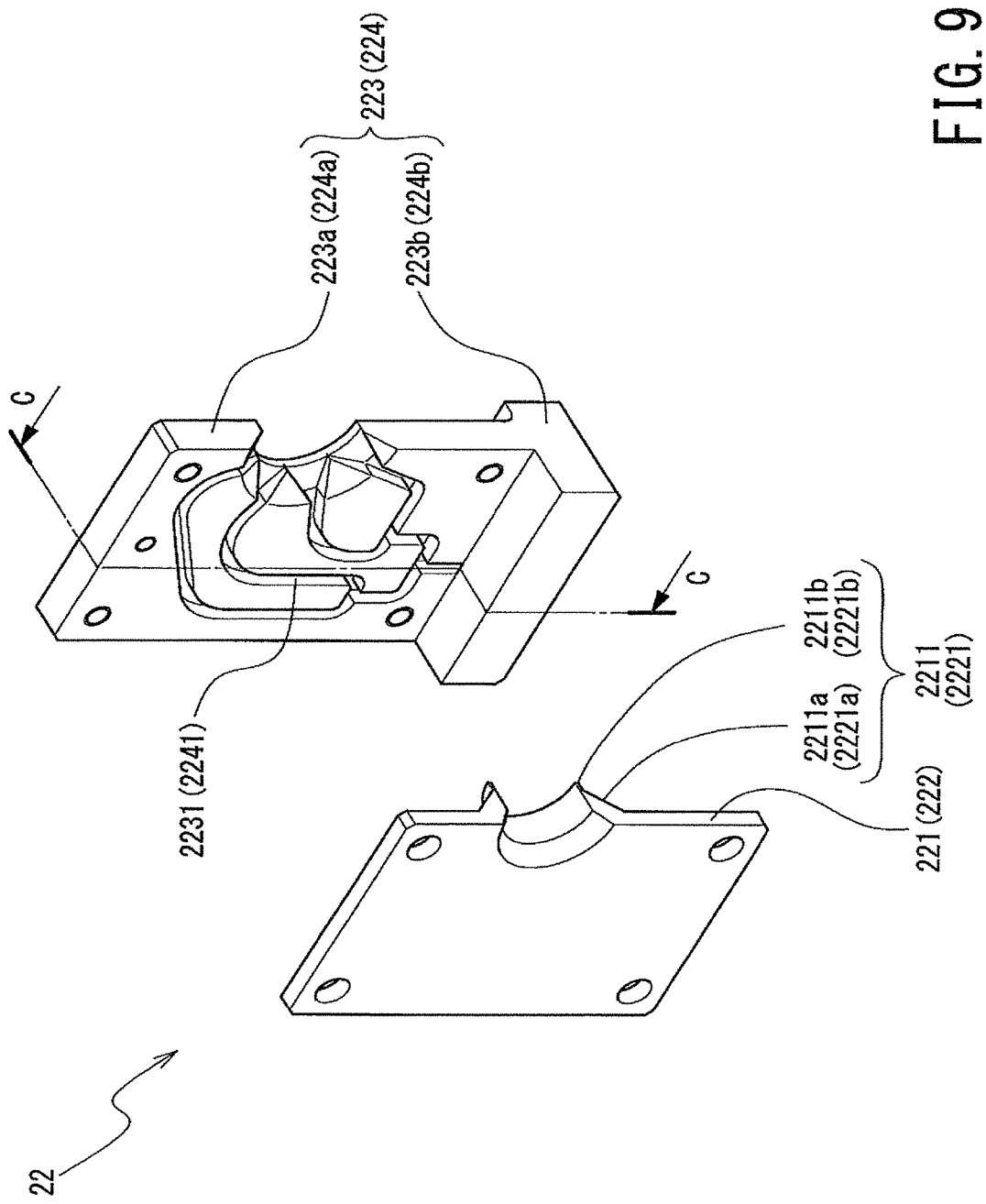
FIG. 9 is an exploded external perspective diagram showing the structures of respective elements in the nozzle of the wire harness manufacturing apparatus according to the second embodiment of the present invention.
Figure 10:
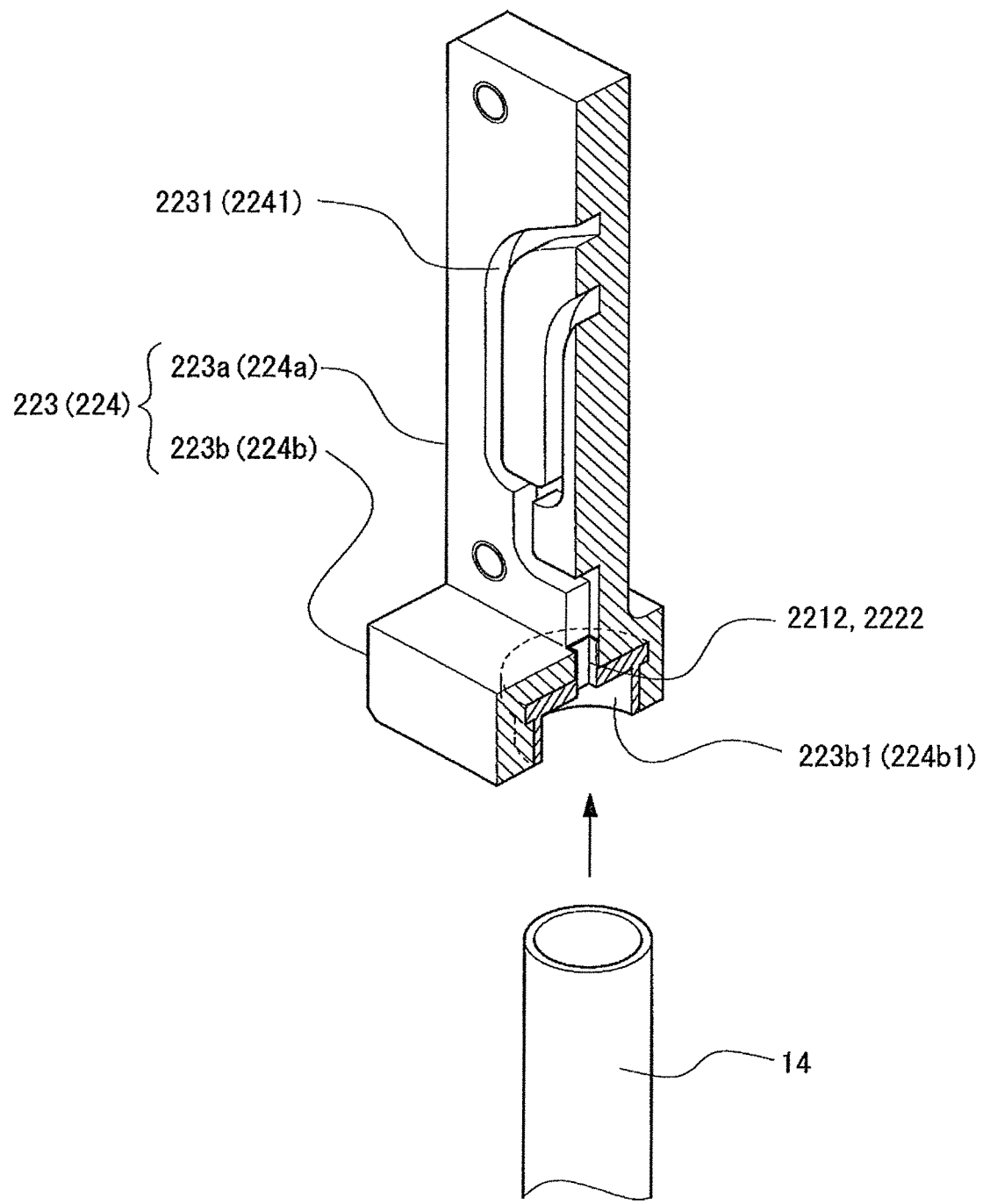
FIG. 10 is a cross-sectional diagram along a line C-C in FIG. 9.
Figure 11:
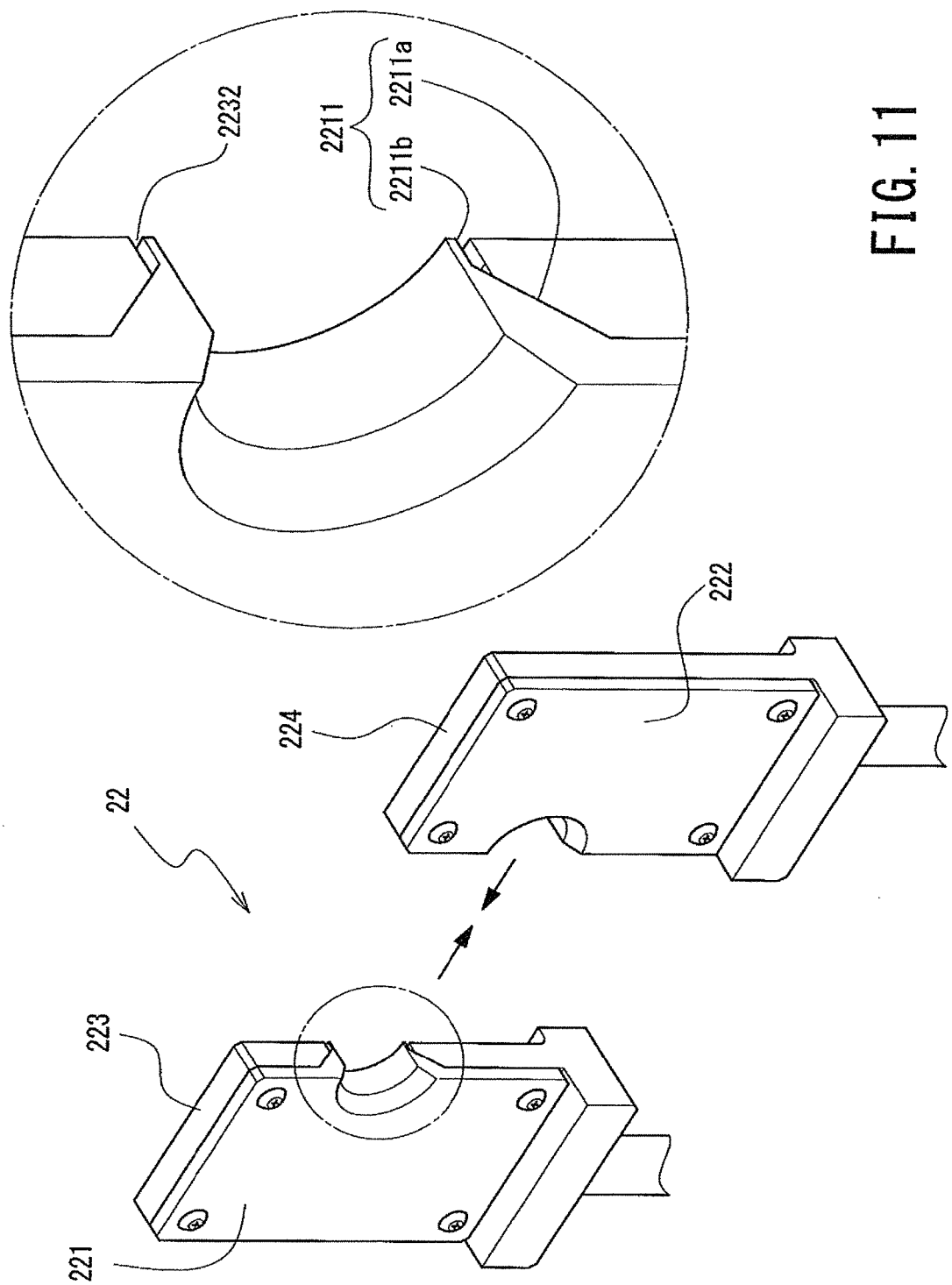
FIG. 11 is an external perspective diagram showing the nozzle built in the wire harness manufacturing apparatus according to the second embodiment of the present invention showing a state where a first tabular member and a second tabular member are separated.
Figure 12B:
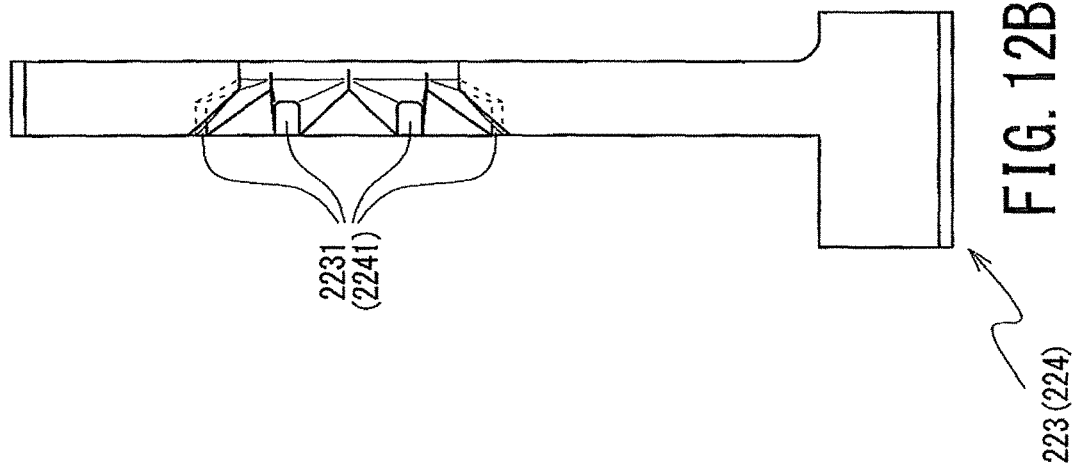
FIG. 12B is a side diagram of the first tabular member (second tabular member)
Figure 12A:
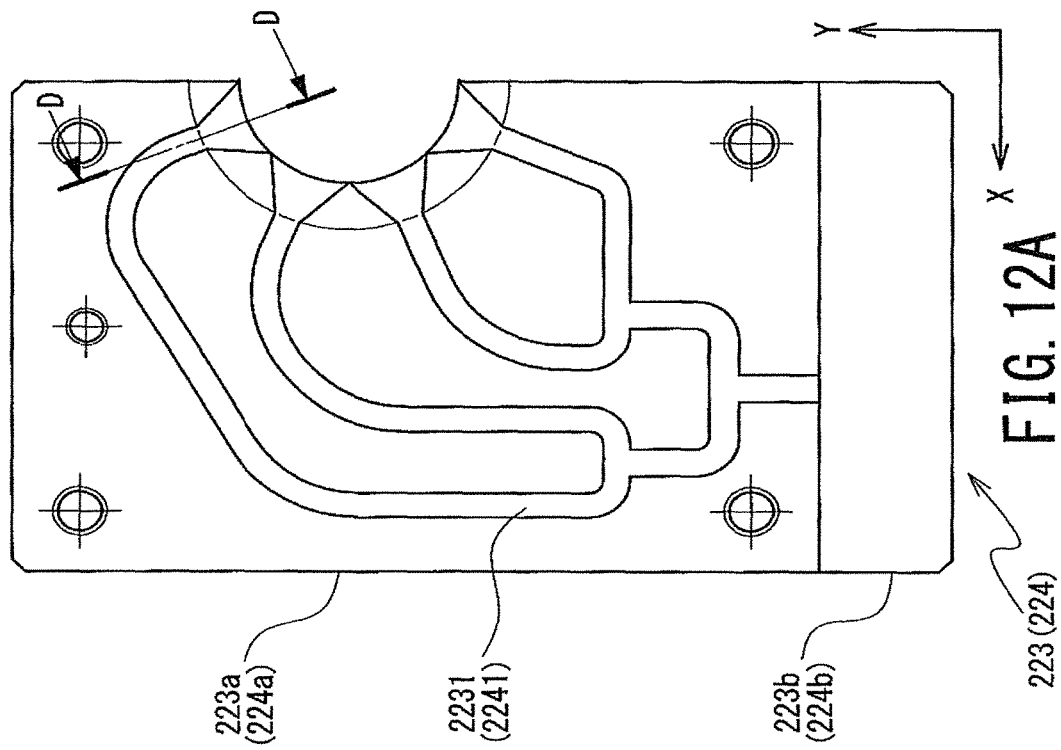
FIG. 12A is a plane diagram showing the structure of the thermoplastic material channels formed in the first tabular member (second tabular member) of the wire harness manufacturing apparatus according to the second embodiment of the present invention.
Figure 13:
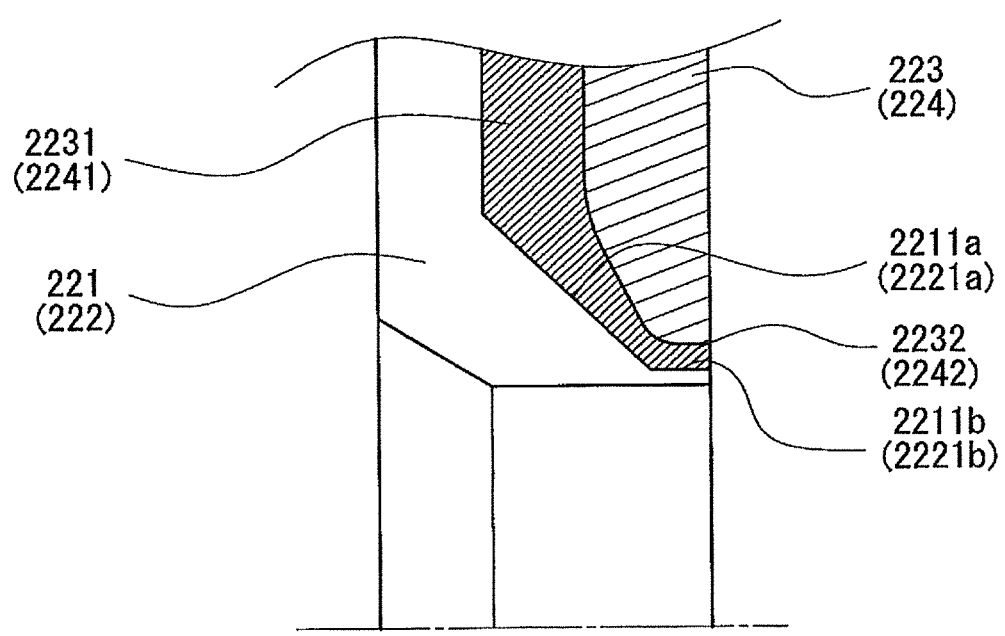
FIG. 13 is a cross-sectional diagram along a line D-D in FIG. 12A in a state where a lid member is fixed.

The nozzle 22 is a tool to mold the covering member 92 by discharging the thermoplastic material plasticized with the material plasticizing unit 11 so as to cover the periphery of the electric wire 91 in the wire harness 9. FIG. 9 is an exploded external perspective diagram showing the structures of respective elements of the nozzle 22. FIG. 10 is a cross-sectional diagram along a line C-C in FIG. 9. FIG. 11 is an external perspective diagram showing a state where the nozzle 22 is built. FIG. 12A is a plane diagram showing a first tabular member 223 (second tabular member 224). FIG. 13 is a cross-sectional diagram along a line D-D in FIG. 12 in a state where a first lid member 221 (second lid member 222) is fixed.

As shown in FIGS. 9 to 10, the nozzle 22 has the first lid member 221, the second lid member 222, the first tabular member 223 and the second tabular member 224. The first lid member 221 can be fixed to the first tabular member 223, and the second lid member 222 can be fixed to the second tabular member 224. The first tabular member 223 and the second tabular member 224 are separably connected in a planar direction (XY planar direction in FIG. 11, i.e. planar direction orthogonal to a thickness direction of the tabular member). Since the first lid member 221 and the second lid member 222 are fixed to the respective first tabular member 223 and the second tabular member 224, thermoplastic material discharge orifices (hereinbelow, simply referred to as "discharge orifices") 2232 and 2242 are formed. When the first tabular member 223 and the second tabular member 224 are connected, the discharge orifices 2232 and 2242 are integrated. It is possible to mold the approximate tubular-shaped covering member 92 by discharging the plasticized thermoplastic material from the discharge orifices 2232 and 2242.

The first tabular member 223 and the second tabular member 224 can be separably connected. When the first tabular member 223 and the second tabular member 224 are connected, one tabular body (tabular structure in which a through hole is formed through a direction orthogonal to the planar direction) is formed.

The first tabular member 223 and the second tabular member 224 can be connected with the electric wire 91, included in a predetermined part of the wire harness 9 according to the embodiments of the present invention, between the two members. That is, the tabular body formed by the connection between the first tabular member 223 and the second tabular member 224 can accommodate the electric wire 91, included in the predetermined part of the wire harness 9 according to the embodiments of the present invention, in the through hole (the electric wire 91 is inserted through the through hole). Then, in a state where the electric wire 91, included in the predetermined part of the wire harness 9 according to the embodiments of the present invention, is accommodated in the through hole of the tabular body formed by the connection between the first tabular member 223 and the second tabular member 224, the tabular body formed by the connection between the first tabular member 223 and the second tabular member 224 and the electric wire 91 included in the predetermined part of the wire harness 9 according to the embodiments of the present invention can relatively move along the axial direction of the electric wire 91.

Accordingly, the through hole of the tabular body formed by the connection between the first tabular member 223 and the second tabular member 224 has a shape and a size to accommodate the electric wire 91 included in the predetermined part of the wire harness 9 according to the embodiments of the present invention. More precisely, as described later, since the through hole of the tabular body is covered with uniform parts 2211b and 2221b of projections 2211 and 2221 in the first lid member 221 and the second lid member 222, the through hole formed with the uniform parts 2211b and 2221b may have any shape and size as long as the through hole accommodates the electric wire 91 included in the predetermined part of the wire harness 9 according to the embodiments of the present invention (see FIG. 13). Further, the cross-sectional shape and size of the tabular body formed by the connection between the first tabular member 223 and the second tabular member 224 define the cross-sectional shape and size of the covering member 92. Further, when plural electric wires 91 are included in the predetermined part of the wire harness 9 according to the embodiments of the present invention, the cross-sectional shape and size of the tabular body define the cross-sectional shape of the bundled electric wires 9. Accordingly, when the cross-sectional shape of the covering member 92 is formed in an approximate circular shape and plural electric wires 91 are bundled to have an approximate circular cross-sectional shape, an approximate circular shape is applied as the cross-sectional shape of the through hole of the tabular body formed by the connection between the first tabular member 223 and the second tabular member 224.

The first tabular member 223 and the second tabular member 224 have relatively thin flat plate members 223a and 224a and relatively thick hose engagement members 223b and 224b. Thermoplastic material channels 2231 and 2241 to be described in detail later are formed in surfaces of the first tabular member 223 and the second tabular member 224 on the side orthogonal to the thickness direction of the flat plate members 223a and 224a. Concave members 223b1 and 224b1 engaged with hoses are formed in the hose engagement members 223b and 224b of the first tabular member 223 and the second tabular member 224. Thermoplastic material channels 2212 and 2222, communicating with the thermoplastic material channels 2231 and 2241, formed in the flat plate members 223a and 224a of the first tabular member 223 and the second tabular member 224, are formed in bottom surfaces of the respective concave members 223b1 and 224b1.

The thermoplastic material channels 2231 and 2241 are formed in the respective first tabular member 223 and the second tabular member 224. Note that the thermoplastic material channel 2231 of the first tabular member 223 and the thermoplastic material channel 2241 of the second tabular member 224 are bilateraly symmetrical. Additionally, surfaces of the first tabular member 223 and the second tabular member 224 in contact with each other are symmetrical surfaces. As shown in FIG. 11, the thermoplastic material channels 2231 and 2241 are grooves formed in the surface of one of the respective flat plate members 223a and 224a of the first tabular member 223 and the second tabular member 224 (surface in close contact with the first lid member or the second lid member). As shown in FIGS. 9 and 11, in the surface of one of the respective flat plate members 223a and 224a of the first tabular member 223 and the second tabular member 224, the thermoplastic material channels 2231 and 2241 have predetermined positions on the side of the hose engagement members 223b and 224b as start points, and positions facing the through hole as end points (arrive at positions facing the through hole).

The thermoplastic material channels 2231 and 2241 branch into plural channels between the start points and the end points. The branched respective thermoplastic material channels 2231 and 2241 extend toward a direction to approach the through hole. Then in the vicinity of the through hole, the respective thermoplastic material channels 2231 and 2241 are formed in a horn shape in which the width is gradually widened toward the through hole in the axial direction. Further, in the horn shaped part, one surface gradually approaches the opposite surface (i.e., in a part in the vicinity of the through hole in the flat plate members 223a and 224a of the first tabular member 223 and the second tabular member 224, the thickness is reduced toward the through hole).

When the branched respective thermoplastic material channels 2231 and 2241 arrive at the through hole, all the channels are joined and integrated. That is, the thermoplastic material flows over the entire length in the circumferential direction outside the through hole formed by the connection between the first tabular member 223 and the second tabular member 224.

When the first tabular member 223 and the second tabular member 224 are connected, the thermoplastic material channels 2231 and 2241 formed in the respective first tabular member 223 and the second tabular member 224 are joined around the through hole. That is, the discharge orifices 2232 and 2242 continuously surround the entire outer peripheral surface of the through hole at one end.

More particularly, as the thermoplastic material channels 2231 and 2241, the following structure, for example, is applicable. The thermoplastic material channels 2231 and 2241 have predetermined positions on the side of the hose engagement members 223b and 224b as start points. Then, the thermoplastic material channels 2231 and 2241 extend from the start points by a predetermined length in the planar direction of the flat plate members 223a and 224a, and branch into two channels. Further, the channels extend by a predetermined length in the planar direction of the flat plate members 223a and 224a, and respectively branch into two channels (branch into total four channels). The branched respective thermoplastic material channels 2231 and 2241 extend while turning in a direction to approach the through hole. Then the branched respective thermoplastic material channels 2231 and 2241 are formed in a horn shape in which the width is gradually widened toward the through hole in the vicinity of the periphery of the through hole. Further, in this part, one surface gradually approaches the opposite surface in a direction to approach the through hole (i.e., in the flat plate members 223a and 224a of the first tabular member 223 and the second tabular member 224, the thickness is gradually reduced toward the through hole). When the channels arrive at the through hole, all the channels are joined and integrated.

Note that the structure of the thermoplastic material channels 2231 and 2241 is not limited to the above-described structure. That is, any structure is applicable as long as the thermoplastic material channels 2231 and 2241 are formed to extend in the planar direction of the flat plate members 223a and 224a and to be joined around the through hole in the respective first tabular member 223 and the second tabular member 224.

The first lid member 221 is fixed to the first tabular member 223. The second lid member 222 is fixed to the second tabular member 224. More particularly, the first lid member 221 is fixed such that a plane part of the first lid member 221 is in close contact with one surface of the flat plate member 223a of the first tabular member 223. Similarly, the second lid member 222 is fixed such that a plane part of the second lid member 222 is in close contact with one surface of the flat plate member 224a of the second tabular member 224. Accordingly, when the first lid member 221 is fixed to the first tabular member 223, the thermoplastic material channel 2231 formed in the first tabular member 223 is capped with the first lid member 221. Similarly, when the second lid member 222 is fixed to the second tabular member 224, the thermoplastic material channel 2241 formed in the second tabular member 224 is capped with the second lid member 222.

Further, the first lid member 221 and the second lid member 222 have the projections 2211 and 2221 projected in a cylindrical shape from the planar parts. As shown in FIG. 11, the projections 2211 and 2221 have taper parts 2211a and 2221a in which the thickness in the radial direction is gradually reduced and the uniform parts 2211b and 2221b in which the thickness in an extending direction from the ends of the taper parts are constant. In a state where the first lid member 221 is fixed to the first tabular member 223, the ends of the projections 2211 and 2221 of the first lid member 221 approximately correspond to the surface on the discharge orifice 2232 of the first tabular member 223 (surface on the opposite side to the surface where the thermoplastic material channel 2231 is formed). Similarly, in a state where the second lid member 222 is fixed to the second tabular member 224, the ends of the projections 2211 and 2221 of the second lid member 222 approximately correspond to the surface on the discharge orifice 2242 of the second tabular member 224 (surface on the opposite side to the surface where the thermoplastic material channel 2241 is formed). Accordingly, the ends of the projections 2211 and 2221 of the first lid member 221 and the second lid member 222 are exposed from the surfaces on the side of the respective discharge orifices 2232 and 2242 of the first tabular member 223 and the second tabular member 224.

Then, as shown in FIG. 13, in the thermoplastic material channels 2231 and 2241, in the vicinity of the through hole, the horn shaped parts in which the width is gradually widened toward the through hole are capped with the taper parts 2211a and 2221a of the projections 2211 and 2221 in the first lid member 221 and the second lid member 222. On the other hand, the outer peripheral surfaces of the uniform parts 2211b and 2221b of the projections 2211 and 2221 are opposite to the inner peripheral surface of a through hole formed by the connection between the first tabular member 223 and the second tabular member 224 with a predetermined distance therebetween. That is, a predetermined gap is formed between the uniform parts 2211b and 2221b of the projections 2211 and 2221 and the through hole. The end of the gap becomes the discharge orifices 2232 and 2242 of the nozzle 22 (the discharge orifices 2232 and 2242 to discharge the plasticized thermoplastic material).

Note that the first lid member 221 and the second lid member 222 may be respectively separably fixed to the first tabular member 223 and the second tabular member 224. However, at least while the wire harness 9 according to the embodiments of the present invention is manufactured, the first lid member 221 and the second lid member 222 are maintained in the fixed state. For example, as shown in FIG. 11, a structure where the first lid member 221 and the second lid member 222 are separably fixed with screws or the like is applicable.

The thermoplastic material channels 2212 and 2222 are formed in the respective hose engagement member 223b of the first lid member 221 and the hose engagement member 224b of the second lid member 222 (see FIG. 10). The thermoplastic material channels 2212 and 2222 are channels to feed the plasticized thermoplastic material to the start points of the thermoplastic material channels 2231 and 2241 formed in the respective flat plate member 223a of the first tabular member 223 capped with the first lid member 221 and flat plate member 224a of the second tabular member 224 capped with the second lid member 222. Accordingly, for example, the thermoplastic material channel 2212 formed in the hose engagement member 223b of the first tabular member 223 has a through-hole shaped structure formed from the bottom surface of the concave member 223b1 of the hose engagement member 223b of the first tabular member 223 to the flat plate member 223a side (the start point of the thermoplastic material channel 2231 formed in the flat plate member 223a of the first tabular member 223). Similarly, the thermoplastic material channel 2222 formed in the hose engagement member 224b of the second tabular member 224 has a through-hole-shaped structure formed from the bottom surface of the concave member 224b1 of the hose engagement member 224b of the second tabular member 224 to the flat plate member 224a side (the start point of the thermoplastic material channel 2241 formed in the flat plate member 224a of the second tabular member 224).

According to the above structure, when the plasticized thermoplastic material is fed to the respective thermoplastic material channels 2212 and 2222 of the hose engagement member 223b of the first tabular member 223 and the hose engagement member 224b of the second tabular member 224, the thermoplastic material is discharged from the discharge orifices 2232 and 2242 through the thermoplastic material channels 2231 and 2241 formed in the flat plate member 223a of the first tabular member 223 and the flat plate member 224a of the second tabular member 224.

Accordingly, inside the first tabular member 223 to which the first lid member 221 is fixed and the second tabular member 224 to which the second lid member 222 is fixed, the flow of the thermoplastic material is as follows.

When the plasticized thermoplastic material is fed to the thermoplastic material channels 2212 and 2222 formed in the respective hose engagement member 223b of the first tabular member 223 and the hose engagement member 224b of the second tabular member 224, the plasticized thermoplastic material flows through these thermoplastic material channels 2212 and 2222, and arrives at the start points of the thermoplastic material channels 2231 and 2241 formed in the respective flat plate member 223a of the first tabular member 223 and the flat plate member 224a of the second tabular member 224. Further, the thermoplastic material flows through the thermoplastic material channels 2231 and 2241 toward the end points.

Since several branches exist between the start points and the end points in the thermoplastic material channels 2231 and 2241, the thermoplastic material branches and flows in accordance with the branch form of the thermoplastic material channels 2231 and 2241. Since the thermoplastic material channels 2231 and 2241 are formed so as to extend in the planar direction, the thermoplastic material flows in the planar direction. When the branch flows of the thermoplastic material pass through the horn part in which the width is gradually widened toward the through hole in the vicinity of the through hole, the branches are joined and integrated at the gap between the uniform parts 2211b and 2221b of the projections 2211 and 2221 of the first lid member 221 and the second lid member 222 and the through hole of the tabular body formed by the connection between the first tabular member 223 and the second tabular member 224. Then the thermoplastic material, in the integrated state, is discharged to the outside from the discharge orifices 2232 and 2242. Since the discharge orifices 2232 and 2242 continuously surround the periphery of one end of the through hole of the tabular body formed by the connection between the first tabular member 223 and the second tabular member 224, the discharged thermoplastic material is formed in a continuous approximate tubular shape having a cross-sectional shape and a size corresponding to the shape and the size of the discharge orifices 2232 and 2242.

Note that the first lid member 221 and the second lid member 222 may be formed with heater panels to increase the fluidity of the thermoplastic material flowing through the thermoplastic material channels 2231 and 2241.

As a modification of the above-described wire harness manufacturing apparatus 2 according to the second embodiment, the following example can be given.

As shown in FIG. 11, the thermoplastic material channels 2231 and 2241 have predetermined positions on the side of the hose engagement members 223b and 224b as start points, and extend from the start points in the planar direction of the flat plate members 223a and 224a by a predetermined length, and branch into two channels. Further, the channels extend in the planar direction of the flat plate members 223a and 224a by a predetermined length, and respectively branch into two branches, i.e., total four branches. Since the thermoplastic material channels 2231 and 2241 formed in this manner are formed so as to extend in the planar direction different from the direction in the first embodiment, the length from the start points to the end points of the respective channels are different.

Accordingly, assuming that the respective channels have the same cross-sectional area, the resistance (line resistances) to the thermoplastic material flowing through the respective branched channels is high when the channel is long. Accordingly, in consideration of pressure loss due to such resistance, it is preferable that, regarding the thermoplastic material channels 2231 and 2241, the cross-sectional area of a channel having a long length from the start point to the end point is increased. For example, in the structure shown in FIG. 11, the channel extending around the farthest part from the through hole in the planar direction (the leftmost channel in FIG. 11) is the longest. Accordingly, the cross-sectional area of this channel is the greatest. The length of a channel extending around a part near the through hole is short (in FIG. 11, the length is shorter toward the right side). Accordingly, the channel cross-sectional area is reduced in accordance with reduction of the channel length.

Next, a wire harness manufacturing method according to the embodiments of the present invention will be described. Hereinbelow, a manufacturing method using the wire harness manufacturing apparatus according to the first embodiment will be described.

First, respectively predetermined connectors and the like are attached to the ends of the respective electric wires 91 included in the wire harness 9 according to the embodiments of the present invention. This process can be performed in a stage prior to the binding of the electric wires 91 in a predetermined form or in a stage prior to the molding of the covering member 92. Accordingly, the process can be performed using a device to automatically attach the connectors and the like to the ends of the electric wires 91 (hereinbelow, simply referred to as an "automatic device").

In a stage after the binding of the electric wires 91 included in the wire harness 9 according to the embodiments of the present invention in a predetermined form or a stage after the molding of the covering member 92, it may be impossible to set predetermined electric wires in the automatic device due to interference by other electric wires 91 and the covering member 92. In such case, it is impossible to attach the connectors and the like to the electric wires 91 using the automatic device and it is necessary to manually attach the connectors and the like. On the other hand, in the wire harness manufacturing method according to the embodiments of the present invention, the connectors and the like can be attached in a stage prior to the binding of the electric wires 91 in a predetermined form or a stage prior to the molding of the covering member 92 (that is, the connectors and the like can be attached to the respective electric wires 91 in an unbound state). Accordingly, the use of the automatic device is not prevented.

Next, the electric wires 91 included in the wire harness 9 according to the embodiments of the present invention are bundled in a predetermined form (a predetermined trunk line and predetermined branch lines are formed). This operation is performed using e.g. a drawing board or the like on which the form of the electric wires 91 in the wire harness 9 of the present invention is illustrated or otherwise represented. The content of the operation is the same as a conventional operation. Further, as the drawing board, a conventionally known board is applicable. Accordingly, the explanation of the operation will be omitted.

Next, the covering member 92 is formed in a predetermined part of the bundled electric wires 91. More particularly, the formation of the covering member 92 is performed as follows. FIGS. 14 to 17 schematically show the processes of molding the covering member 92.

Figure 14:
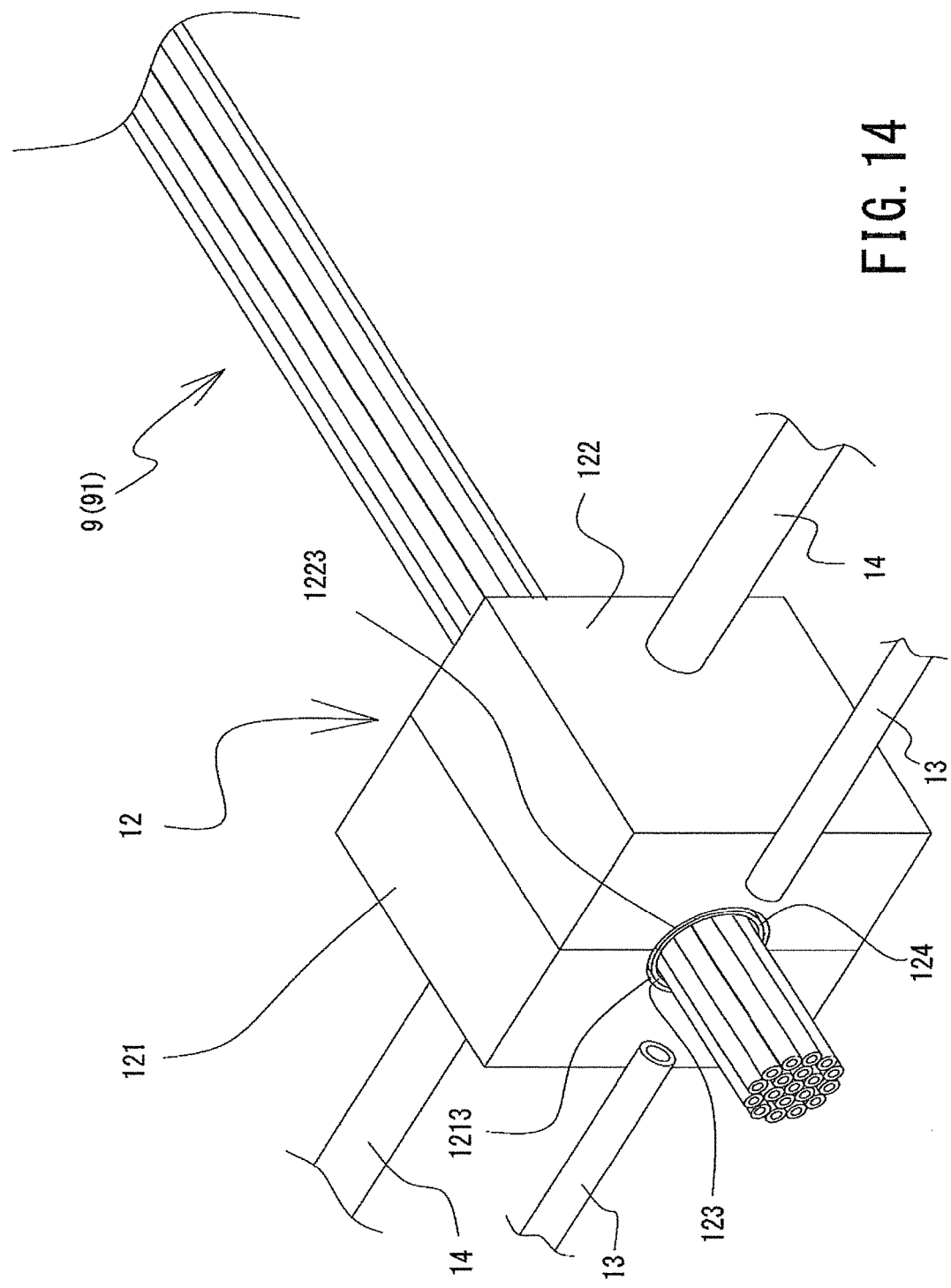
FIG. 14 is a perspective diagram schematically showing a step of forming a covering member.

First, as shown in FIG. 14, a predetermined part of the electric wires 91 (one end of a part where the covering member 92 is formed in the axial direction) is held between the first case body member 121 in which the first nest member 123 is fitted and the second case body member 122 in which the second nest member 124 is fitted (i.e., with the nozzle 12). Then, the first case body member 121 and the second case body member 122 are connected. In this state, the one end of the predetermined part of the electric wires 91 in the axial direction is accommodated in the through hole of the tubular body formed by the connection between the first nest member 123 and the second nest member 124.

The first nest member 123 and the second nest member 124 have structures obtained by dividing a tubular body into halves along the axial direction. Accordingly, by bringing the first nest member 123 and the second nest member 124 from side positions of the electric wires 91 and connecting the first nest member 123 and the second nest member 124 with the electric wires 91 therebetween, the predetermined part of the electric wires 91 can be accommodated in the through hole of the tubular body formed by the connection between the first nest member 123 and the second nest member 124. Accordingly, it is not necessary to insert the electric wires from one end of the through hole of the tubular body formed by the connection between the first nest member 123 and the second nest member 124. Even when the connectors and the like are attached to the ends of the electric wires 91, the connectors and the like do not disturb this operation. In this manner, in the wire harness manufacturing method according to the embodiments of the present invention, the order of attachment of the connectors and the like to the ends of the electric wires 91 and the molding the covering member 92 in a predetermined part of the electric wire 91 is not limited. Accordingly, when the connectors and the like have been attached to the ends of the electric wire 91, the covering member 92 can be molded in the predetermined part of the electric wires 91.

On the other hand, in the method of inserting the predetermined part of the electric wires 91 into the through hole of the connected structure of the first nest member 123 and the second nest member 124, when the connectors attached to the ends of the electric wires 91 are greater than the inner diameter of the through hole, the predetermined part of the electric wire 91 cannot be inserted into the through hole.

Then, the thermoplastic material is heated with the material plasticizing unit 11 to a predetermined temperature and is plasticized, and the plasticized thermoplastic material is sent through the hose 14 to the thermoplastic material channels 1212 and 1222 formed in the first case body member 121 and the second case body member 122 of the nozzle 12. The thermoplastic material sent to the thermoplastic material channels 1212 and 1222 formed in the first case body member 121 and the second case body member 122 flows through the thermoplastic material channels 1212 and 1222 and arrives at the thermoplastic material channels 1231 and 1241 formed in the first nest member 123 and the second nest member 124. Further, the thermoplastic material flows through the thermoplastic material channels 1231 and 1241 formed in the first nest member 123 and the second nest member 124 toward the discharge orifices 1213 and 1223.

When the plasticized thermoplastic material flows through the thermoplastic material channels 1231 and 1241 formed in the first nest member 123 and the second nest member 124 toward the discharge orifices 1213 and 1223, the thermoplastic material also branches and flows in accordance with the branch form of the thermoplastic material channels 1231 and 1241. The branched thermoplastic material flows are joined in a position closest to one end of the connected structure of the first nest member 123 and the second nest member 124 in the axial direction, combined and integrated.

Then the thermoplastic material, in the integrated state, is discharged from the discharge orifices 1213 and 1223 of the first case body member 121 and the second case body member 122 of the nozzle 12 to the outside of these members (i.e., the outside the nozzle 12).

The discharge orifices 1213 and 1223 formed in the nozzle 12 are formed in the closest vicinity of the outside of the through hole of the tubular body formed by the connection between the first nest member 123 and the second nest member 124, so as to continuously surround the through hole. Accordingly, the thermoplastic material discharged from the discharge orifices 1213 and 1223 of the first case body member 121 and the second case body member 122 of the nozzle 12 covers the periphery of the electric wires 91, and is formed in an approximate tubular shape, and becomes the covering member 92. As the thermoplastic material channels 1231 and 1241 formed in the first nest member 123 and the second nest member 124 are joined in the closest vicinity of the discharge orifices 1213 and 1223, the thermoplastic material flows are also joined, combined and integrated. Accordingly, the covering member 92 is integrally formed of the thermoplastic material without seam or discontinuity.

The temperature of the thermoplastic material, newly discharged from the discharge orifices 1213 and 1223, (the covering member 92 immediately after the molding) is at a plastic-deformable temperature by thermo plasticity, and the thermoplastic material is soft so that the plastic deformation is possible by application of external force. Further, the temperature of the thermoplastic material is lower than that immediately after injection in general injection molding or that immediately after pressing in general press molding, and is in a plastic-undeformable state in comparison with these states. In this manner, as the discharged and molded covering member 92 has low fluidity (it does not flow unless it receives an external force, that is, it hardly flows by its own weight or the like), it does not enter a gap between the electric wires 91. Note that there is a possibility that the thermoplastic material enters the gap between the electric wires 91 when this state is maintained for many hours. However, since the temperature of the discharged thermoplastic material is low, when the thermoplastic material is exposed to ambient air (normal temperature air), the temperature is lowered to a temperature at which the plastic deformation by thermo plasticity does not occur before the thermoplastic material enters the gap between the electric wires 91. In this manner, the discharged covering member 92 does not enter the gap between the electric wires 91 and connect the electric wires.

Accordingly, in the wire harness manufacturing method according to the embodiments of the present invention, in comparison with the structure where a tape is wrapped around the electric wires, the structure where the covering member is formed by injection molding and the structure where the periphery of the electric wire is coated with plasticized thermoplastic material, degradation of the flexibility of the predetermined part of the electric wire (the part in which the covering member is molded) (especially bendability) can be prevented or suppressed.

That is, in the structure where the tape is wrapped around the electric wires, since the electric wires are fastened with the tape, the electric wires are in close contact as if they thrust each other at predetermined pressure. Accordingly, since the predetermined part is in a state as if all the electric wires were integrally attached, the flexibility of the tape-wrapped part is lowered. Further, in the structure where the covering member is formed by injection molding and the structure where the covering member is formed by coating the electric wires with the plasticized thermoplastic material, the injected thermoplastic material or the applied thermoplastic material enters a gap between the electric wires and connects the electric wires. Further, the gap between the electric wires is filled with the thermoplastic material. Accordingly, since the part enters a state as if all the electric wires were integrally connected, and no hollow exists between the electric wires, the flexibility of the part in which the covering member is formed is lowered.

On the other hand, according to the wire harness manufacturing method according to the embodiments of the present invention, it is possible to manufacture a wire harness having a structure in which the molded covering member 92 does not firmly connect the electric wires 91. Further, it is possible to manufacture a wire harness having a structure in which the thermoplastic material does not enter a gap between the electric wires. According to the wire harness manufacturing method according to the embodiments of the present invention, it is possible to manufacture a wire harness in which the flexibility of a part where the covering member 92 is formed is not lowered.

A part of the inner peripheral surface of the covering member 92 discharged from the discharge orifices 1213 and 1223 and formed in an approximate tubular shape is in contact with a part or the entire surface of the electric wires 91. The covering member 92 immediately after the discharge from the discharge orifices 1213 and 1223 is in a plastic-deformable state by thermo plasticity, and its surface has viscosity. Accordingly, in the inner peripheral surface of the covering member 92, a part in contact with the electric wires 91 is attached to the electric wires 91.

As described above, when single or a small number of electric wires 91 are included in the predetermined part of the wire harness 9 according to the embodiments of the present invention, as the inner peripheral surface of the covering member 92 is in contact with the outer peripheral surfaces of all the electric wires 91, all the electric wires 91 are attached to the inner peripheral surface of the covering member 92. On the other hand, when a large number of electric wires 91 are included in the predetermined part, an electric wire surrounded with other electric wires 91 and not exposed to the outside of the bundle of the electric wires 91 is not in contact with the inner peripheral surface of the covering member 92. Especially, as described above, the covering member 92 discharged from the discharge orifices 1213 and 1223 has a low fluidity, accordingly, it does not enter a gap between the electric wires 91 to arrive at and in contact with the surface of the unexposed electric wire 91. Accordingly, the inner peripheral surface of the covering member 92 is not attached to such electric wire 91. Accordingly, in this case, a structure where the inner peripheral surface of the covering member 92 is attached to a part of the plural electric wires 91 is obtained.

Figure 15:
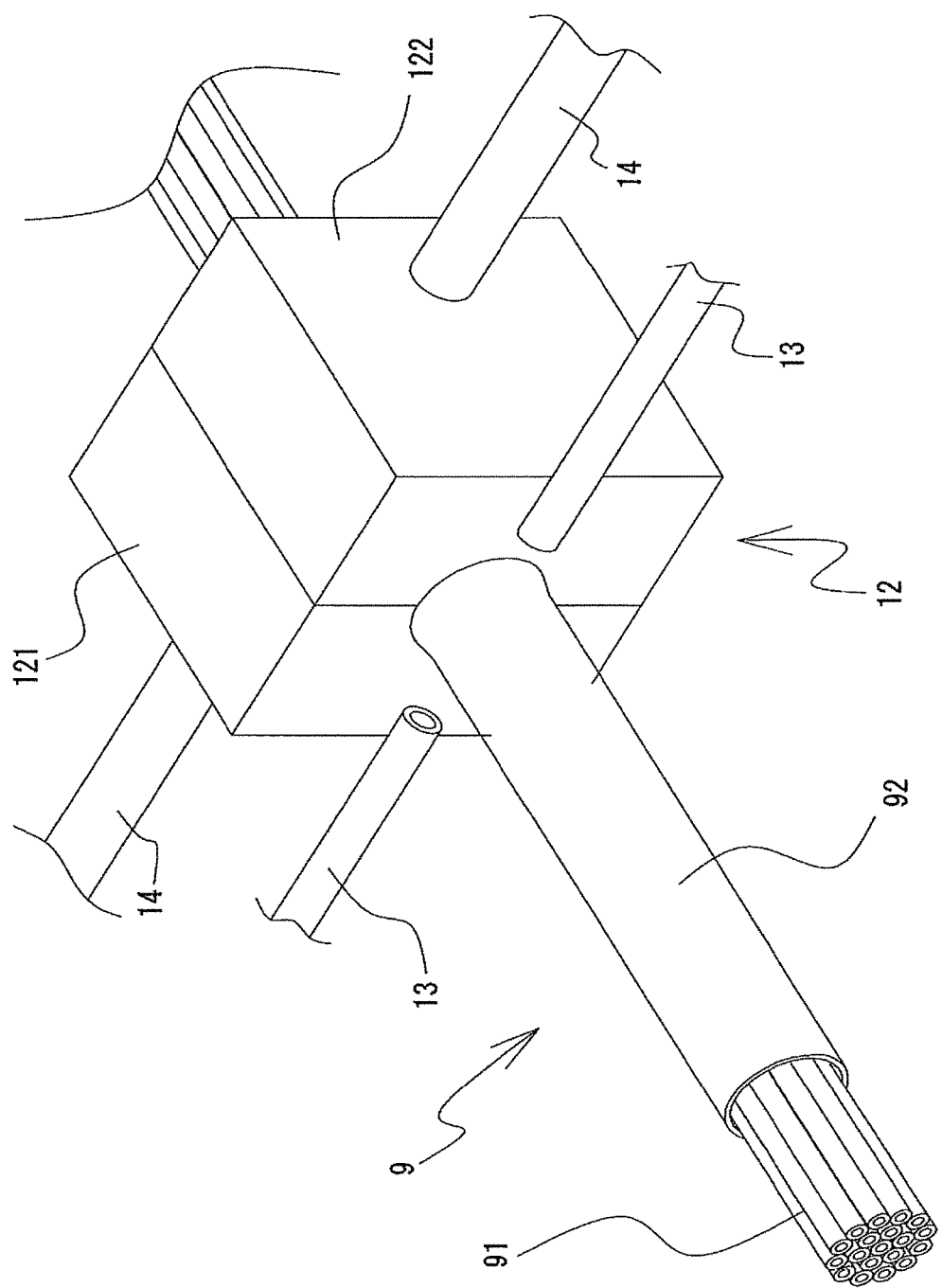
FIG. 15 is a perspective diagram schematically showing another step of forming the covering member.

As shown in FIG. 15, while the thermoplastic material is discharged from the discharge orifices 1213 and 1223, the predetermined part of the electric wire 91 and the nozzle 12 (the connected structure of the first case body member 121 and the second case body member 122) are relatively moved along their axial directions. Then the covering member 92 is formed within the range of the relative movement in the predetermined part of the electric wires 91.

Note that as long as the size of the predetermined part of the electric wires 91 is set such that it can be accommodated in the through hole of the tubular body formed by the connection between the first nest member 123 and the second nest member 124, it is possible to mold the covering member 92 regardless of the outer diameter of the electric wire 91 (when plural electric wires 91 are included, the outer diameter of the entire bundle of the electric wires 91). Accordingly, even when the diameter of the predetermined part of the electric wire 91 is changed in the middle of the axial direction, the molding of the covering member 92 can be continued by continuing the relative movement between the nozzle 12 and the electric wire 91 and the discharge of the thermoplastic material. As a result, in the predetermined part of the electric wire 91, the covering member 92 can be molded integrally over the parts having different outer diameters. That is, as long as the outer diameter of the electric wire 91 has a size that the electric wire can be accommodated in the through hole of the tubular body formed by the connection between the first nest member 123 and the second nest member 124, even when the outer diameter is changed in the middle of the axial direction, the molding of the covering member 92 can be continued without change of nozzle 12.

The thickness of the molded covering member 92 is determined in correspondence with the amount of thermoplastic material discharged from the discharge orifices 1213 and 1223 of the nozzle 12 per unit time and the speed of relative movement between the nozzle 12 and the electric wires 91. That is, when the amount of the thermoplastic material discharged from the discharge orifices 1213 and 1223 per unit time is increased or the speed of relative movement between the nozzle 12 and the electric wires 92 is reduced, the thickness of the molded covering member 92 is increased. In this manner, it is possible to control the thickness of the molded covering member 92 by controlling at least one of the amount of the thermoplastic material discharged from the discharge orifices 1213 and 1223 per unit time and the speed of relative movement between the nozzle 12 and the predetermined part of the electric wires 91.

Accordingly, when the amount of the thermoplastic material discharged from the discharge orifices 1213 and 1223 per unit time and the speed of relative movement between the nozzle 12 and the predetermined part of the electric wires 91 are constant, the thickness of the molded covering member 92 is approximately uniform over the entire length in the axial direction. That is, the covering member 92 as shown in FIG. 1 is formed. On the other hand, it is possible to mold the covering member 92 in which the thickness changes along the axial direction by changing one or both of the amount of the thermoplastic material discharged from the discharge orifices 1213 and 1223 per unit time and the speed of relative movement between the nozzle 12 and the predetermined part of the electric wires 91 in the middle. That is, the covering member 92 as shown in FIG. 2 is formed. In this manner, it is possible to integrally mold the covering member 92 in which the thickness changes along the axial direction not by attaching another part but by discharging the thermoplastic material.

In this structure, even when the predetermined part of the electric wires 91 is to be especially protected, it is not necessary to attach another part as a protector member. Further, it is possible to control the thickness of the covering member 92 by controlling one or both of the speed of relative movement between the nozzle 12 and the predetermined part of the electric wires 91 and the amount of the thermoplastic material discharged from the discharge orifices 1213 and 1223 of the nozzle 12 per unit time. Accordingly, it is possible to easily control the shape and size of the covering member 92 and avoid increment in the number of process steps. Accordingly, it is possible to suppress the rise of manufacturing cost or reduce the manufacturing cost.

When the nozzle 12 and the predetermined part of the electric wires 91 are relatively moved and the nozzle 12 is positioned at the other end of the predetermined part of the electric wires 91 (the other end of the part where the covering member 92 is formed) (i.e., when the covering member 92 is formed in the predetermined part of the electric wires 91), the relative movement between the nozzle 12 and the predetermined part of the electric wires 91 is stopped, and the discharge of the thermoplastic material is stopped.

Figure 16:
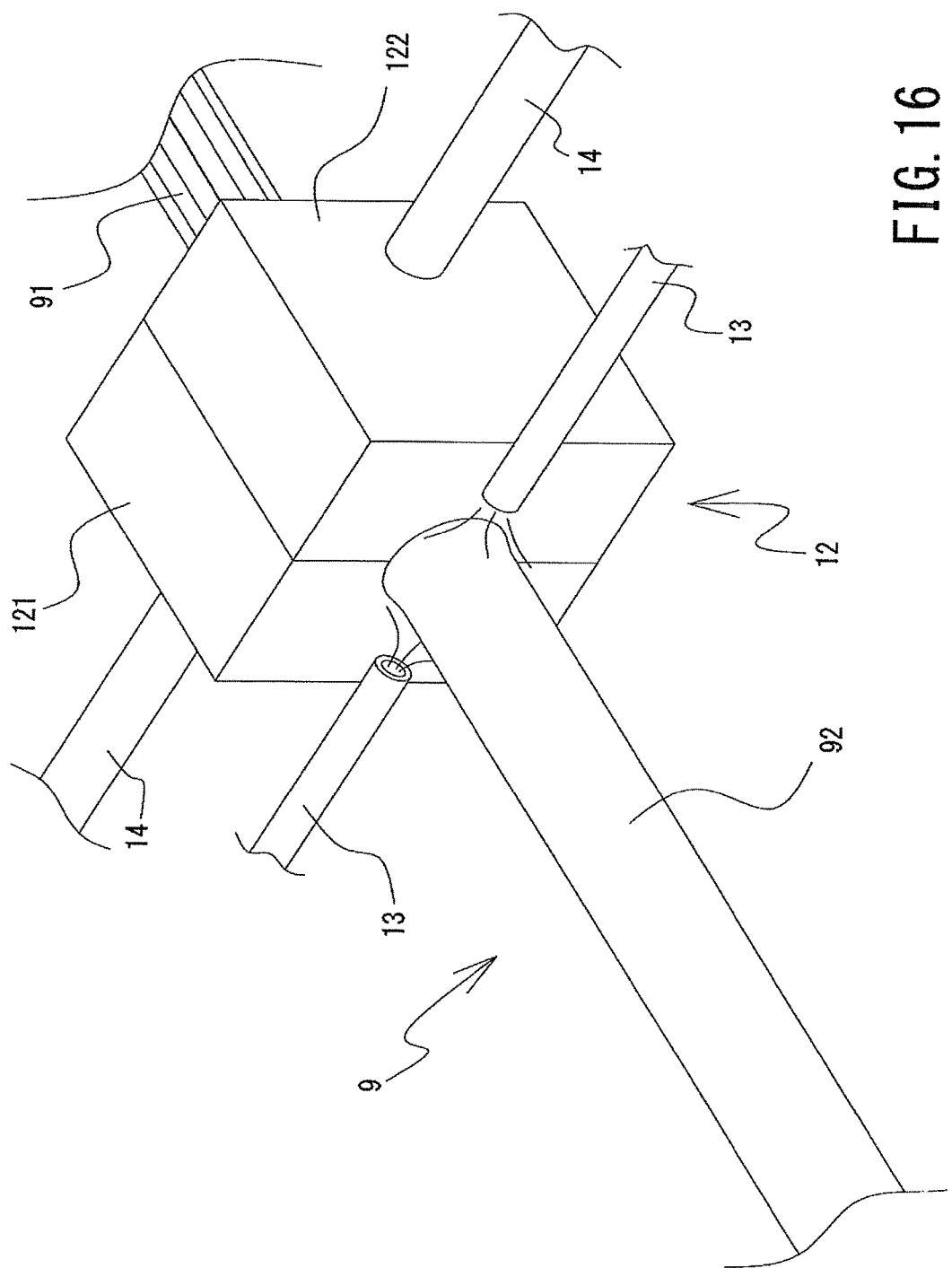
FIG. 16 is a perspective diagram schematically showing another step of forming the covering member.
Figure 17:
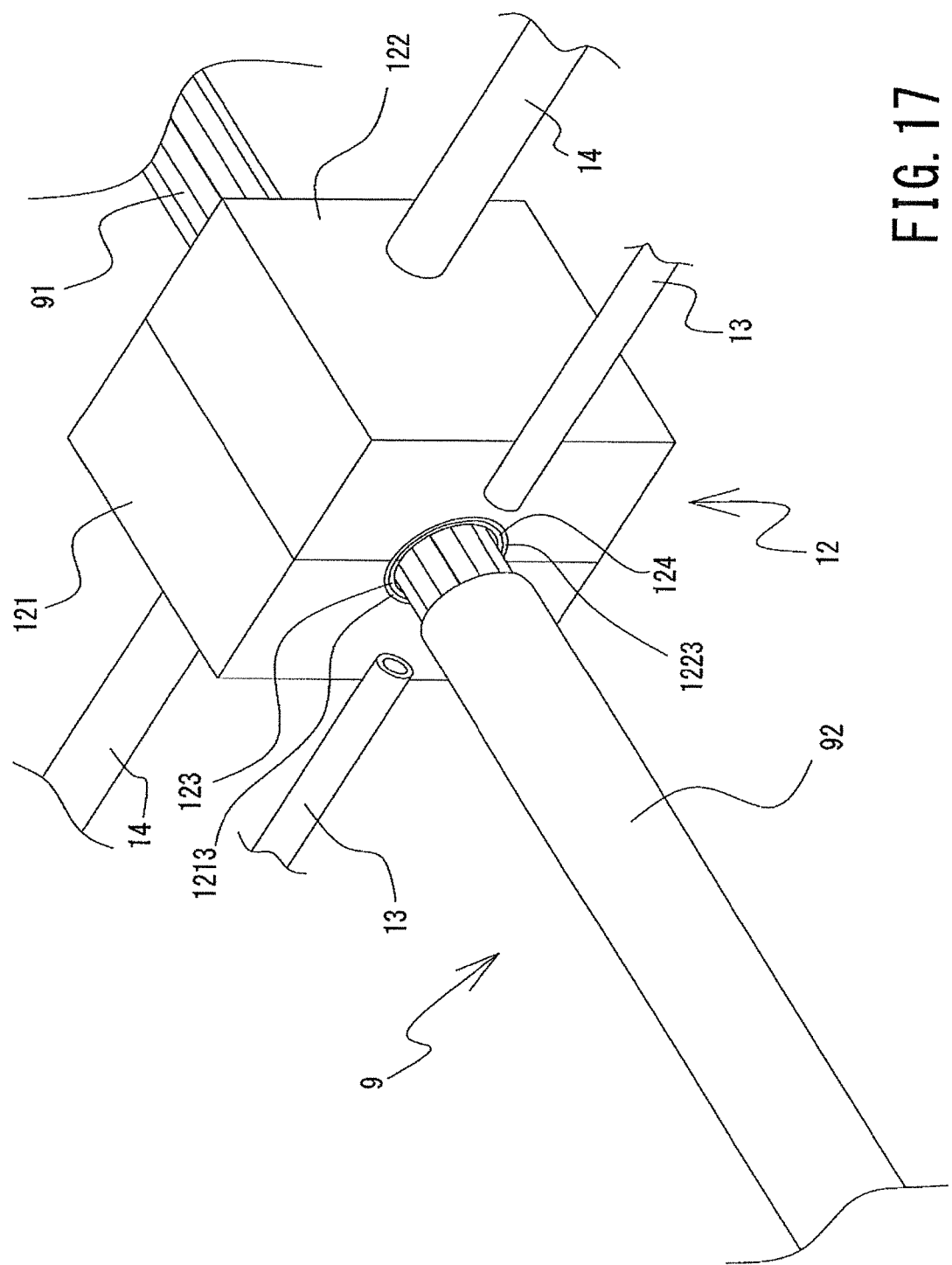
FIG. 17 is a perspective diagram schematically showing another step of forming the covering member.

Thereafter, as shown in FIG. 16, the air blowing unit 13 sends air to at least a part of the molded covering member 92 closest to the discharge orifices 1213 and 1223 of the nozzle 12. When the air is sent to the molded covering member 92, the temperature of the molded covering member 92 is lowered, and the covering member 92 is in a state where plastic deformation by thermo plasticity does not occur. Further, thereafter, as shown in FIG. 17, when the nozzle 12 and the predetermined part of the electric wires 91 are relatively moved, the molded covering member 92 is cut from the thermoplastic material remaining in the nozzle 12 (thermoplastic material to be molded in the covering member 92) at the discharge orifices 1213 and 1223 of the nozzle 12, and separated from the nozzle 12.

In the above structure, it is possible to cut the molded covering member 92 without plastic deformation to pull it out. Accordingly, it is possible to improve the appearance of the end of the covering member 92 in the axial direction.

That is, the covering member 92 newly discharged from the discharge orifices 1213 and 1223 of the nozzle 12 is at a plastic-deformable temperature by thermo plasticity. Accordingly, in this state, when the nozzle 12 and the predetermined part of the electric wires 91 are relatively moved, the discharged and molded covering member 92 is pulled out and plastic-deformed. The end of the covering member 92 is flaggy, and the appearance is bad. Note that in a position closest to the discharge orifices 1213 and 1223 of the nozzle 12, since the molded covering member 92 is in a plastic-deformable state by thermo plasticity, it is difficult to cut the covering member. Further, when a cutting tool is used to cut the covering member 92, there is a probability of damaging the electric wires 91 with this cutting tool.

On the other hand, according to the wire harness manufacturing method according to the embodiments of the present invention, it is possible to cut the molded covering member 92 to have a good appearance for the following reason. When the air blowing unit 13 sends air to at least a part of the molded covering member 92 closest to the discharge orifices 1213 and 1223 of the nozzle 12, this part of the covering member 92 is quickly cooled down. Accordingly, in this part of the covering member 92, plastic deformation by thermo plasticity does not occur. On the other hand, since the thermoplastic material existing in the nozzle 12 does not receive air sent from the air blowing unit 13, it is in a plastic-deformable state by thermo plasticity. As a result, the thermoplastic material (including the molded covering member 92) has a border between a part where plastic deformation by thermo plasticity does not occur and a part in the plastic-deformable state by thermo plasticity in the position of the discharge orifices 1213 and 1223 of the nozzle 12.

In this state, when the nozzle 12 and the predetermined part of the electric wires 91 are relatively moved, the thermoplastic material existing in the nozzle 12 remains inside the thermoplastic material channels 1231 and 1241 formed in the first nest member 123 and the second nest member 124 by friction between the inner peripheral surfaces of the thermoplastic material channels 1231 and 1241 formed in the first nest member 123 and the second nest member 124, and the inner peripheral surfaces of the fitting concave members 1211 and 1221 of the first case body member 121 and the second case body member 122. On the other hand, the part of the thermoplastic material discharged from the discharge orifices of the nozzle 12 (the molded covering member 92) is in a state where plastic deformation by thermo plasticity does not occur, therefore it is not plastic-deformed even when it receives a tensile force in the axial direction. Accordingly, at the discharge orifices of the nozzle 12 (i.e., on the border between the deformable part by thermo plasticity and the undeformable part), it is possible to cut the molded covering member 92 and the unmolded thermoplastic material without plastic deformation to pull them out. It is possible to form the border between the thermoplastic-deformable part and the undeformable part in a ring shape by uniformly sending air from the periphery of the covering member 92, thus improving the appearance of the cut ends. Accordingly, it is possible to improve the appearance of the cut end of the covering member 92 in the axial direction.

Note that in the wire harness manufacturing method according to the embodiments of the present invention, the heating temperature for the thermoplastic material is low in comparison with the temperature in general injection molding and press molding. Particularly, the temperature around a lower limit of temperature range where the thermoplastic material is plastic-deformable by thermo plasticity is preferably applied. Accordingly, it is possible to cool down the molded covering member 92 to a temperature at which plastic deformation by thermo plasticity does not occur (or plastic deformation by thermo plasticity is suppressed) even by sending air at a normal temperature. Accordingly, a device to control air temperature (air cooling device) is unnecessary, the structure of the wire harness manufacturing apparatus 1 according to the embodiments of the present invention is not complicated, and the increment in the number of parts is prevented. Accordingly, an increase of equipment cost is prevented.

Through the above-described processes, the covering member 92 is formed in the predetermined part of the electric wires 91. Note that the same manufacturing method is applicable to the wire harness manufacturing apparatus according to the second embodiment (in the above description, the nozzle 12 is replaced with the nozzle 22).

The wire harness according to the embodiments of the present invention, the wire harness manufacturing apparatus according to the embodiments of the present invention and the wire harness manufacturing method according to the embodiments of the present invention have advantages as follows.

In the wire harness according to the preferred embodiments of the present invention, the reduction of the flexibility of a part in which the covering member 92 is molded can be prevented or suppressed. Accordingly, when the wire harness according to the preferred embodiments of present invention is arranged inside a vehicle or the like, since the predetermined part can be easily deformed, the working efficiency of the arranging can be improved.

As a part of the inner peripheral surface of the molded covering member 92 is attached to the predetermined part of the electric wires 91, the molded covering member 92 is not moved from the predetermined part of the electric wires 91. Accordingly, it is unnecessary to fix the covering member 92 to the electric wires 91 to prevent movement of the molded covering member 92.

Further, the appearance of the wire harness is good in comparison with a structure where a tape as a covering member is wrapped around the electric wire.

In the wire harness manufacturing apparatus 1 according to the first embodiment of the present invention, it is possible to prevent or suppress the rise of equipment cost or reduce the equipment cost.

For example, the nozzle 12 applied to the wire harness manufacturing apparatus 1 according to the first embodiment of the present invention has a simple structure and is manufactured at a low cost in comparison with an injection mold die. That is, the injection mold die requires a structure to resist pressure of injected thermoplastic material. On the other hand, since no high pressure is applied to the nozzle 12 used the wire harness manufacturing apparatus 1 according to the first embodiment of the present invention, the structure to resist high pressure is not required. Accordingly, the nozzle 12 has a simple structure and can be manufactured in a small size.

Further, in general injection molding, a mold clamping mechanism is required so as not to separate upper and lower molds of the molding die due to the pressure of the injected thermoplastic material. Accordingly, the structure of equipment to form the covering member is complicated and is expensive. On the other hand, in the wire harness manufacturing apparatus 1 according to the first embodiment of the present invention, even while thermoplastic material is discharged, no force to separate integrally-connected plural casing members 121, 122 is applied. Accordingly, the wire harness manufacturing apparatus 1 according to the first embodiment of the present invention does not require a mechanism corresponding to the mold clamping mechanism in the equipment for injection molding.

Further, in general injection molding, it is necessary to apply high pressure to the thermoplastic material to fill thermoplastic material in a mold die. On the other hand, in the structure of the wire harness manufacturing apparatus 1 according to the first embodiment of the present invention, it is sufficient to merely apply pressure to the plasticized resin material at a level to pass through (flow) the thermoplastic material channels 1212 and 1222 formed in the respective first case body member 121 and the second case body member 122 and the thermoplastic material channels 1231 and 1241 formed in the respective first nest member 123 and the second nest member 124. Accordingly, in comparison with the injection molding, since the pressure applied to the thermoplastic material is low, a small sized device is applicable as a device to feed the thermoplastic material. Further, a thermoplastic material channel (hose or the like connecting a material plasticizing unit 13 with the nozzle 12) does not require a structure to resist high pressure.

Further, in the structure where the covering member is molded by injection molding, the size of the molding die is determined in correspondence with the size of the covering member to be molded. Accordingly, the size of the molding die is increased in accordance with increment in the size of the covering member to be molded (e.g., increment in the length in the axial direction). On the other hand, it is possible to set the length in the axial direction of the nozzle 12 applied in the wire harness manufacturing apparatus 1 according to the first embodiment of the present invention, to a short length, not depending on the length of the molded covering member 92 in the axial direction. That is, it is possible to mold a covering member longer than the nozzle 12 in the axial direction. Further, it is possible to arbitrarily set the length of the covering member 92 to be molded in the axial direction.

In this manner, in the wire harness manufacturing apparatus 1 according to the first embodiment of the present invention, it is possible to prevent or suppress the equipment cost or delete the equipment cost.

Further, the wire harness manufacturing apparatus 1 according to the first embodiment of the present invention has high versatility.

For example, in the structure to form a covering member by injection molding, only one type (one size and one shape) of covering member is molded with a set of mold dies. Accordingly, to form a covering member in which the thickness changes, it is necessary to prepare mold dies for respective thicknesses of the covering member. Similarly, to form a covering member in which the axial directional length changes, it is necessary to prepare mold dies for respective axial directional lengths of the covering member. On the other hand, the nozzle 12 applied to the wire harness manufacturing apparatus 1 according to the first embodiment of the present invention can change the thickness of the covering member by controlling the speed of relative movement of the nozzle 12 with respect to a predetermined part of the electric wire 91 and/or controlling the discharge amount of the thermoplastic material per unit time. Accordingly, it is possible with the pair of nozzles 12 to form the covering member 92 in which the thickness changes. Further, it is possible to form a covering member in an appropriate length in the predetermined part of the electric wire 91 by appropriately setting a range of relative movement of the nozzle 12 with respect to the predetermined part of the electric wire 91.

Accordingly, it is possible with the pair of nozzles 12 to form the covering member 92 in which the thickness changes.

Further, when the predetermined part of the electric wire 91 has a size to be accommodated in the through hole formed with connected plural nest members 123, 124, the covering member 92 can be molded regardless of the outer diameter of the predetermined part of the electric wire 91. Accordingly, it is possible to handle the plural sizes of the electric wire (when plural electric wires are included, the diameter of the electric wire bunch) with the pair of nozzles 12. Further, even when the diameter of the electric wire 91 changes in the middle of the axial direction, it is possible to integrally mold the covering member 92 over the diameter-change part without discontinuity (or without nozzle 12 change).

On the other hand, the wire harness manufacturing apparatus 2 according to the second embodiment of the present invention has the same advantages as those of the wire harness manufacturing apparatus 1 according to the above-described first embodiment, and advantages as follows.

In the wire harness manufacturing apparatus 2 according to the second embodiment of the present invention, the thermoplastic material channels 2231 and 2241 are formed in the planar direction of the tabular body formed by the connection between the first tabular member 223 (flat plate member 223*a*) and the second tabular member 224 (flat plate member 224*a*). That is, the thermoplastic material channels 2231 and 2241 extend in a direction orthogonal to the axial direction of the electric wire passing through the through hole of the tabular body. Accordingly, since the thickness of the nozzle 22 (the size in the axial direction of the electric wire) can be reduced, the covering member can be formed to a position closer to the root (branch point or the like) of the electric wire.

Figure 18A:
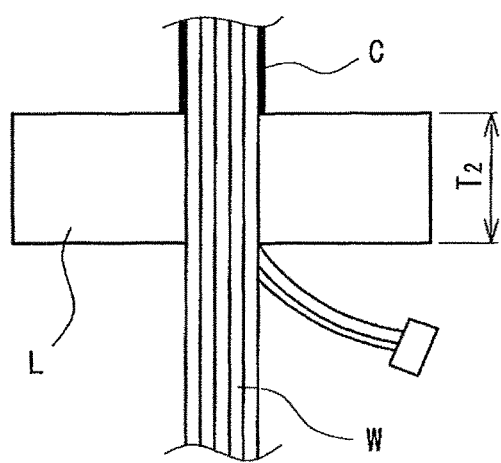
FIGS. 18A and 18B are schematic diagrams for explaining advantages of the wire harness manufacturing apparatus according to the second embodiment of the present invention.
Figure 18B:
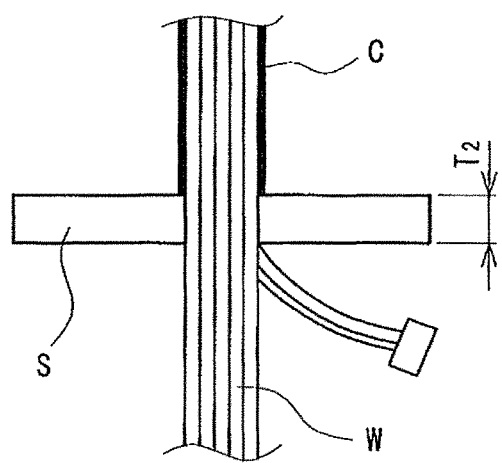

This point will be described more particularly with reference to the schematic diagram of FIGS. 18A and 18B. Here a comparison will be made between an example as shown in FIG. 18A in which a covering member C is formed on the electric wires W using a nozzle L having a relatively large thickness (size in the axial direction of the electric wires W; T1) and an example as shown in FIG. 18B in which the covering member C is formed on the electric wires W using a nozzle S having a relatively small thickness (size in the axial direction of the electric wires W; T2). It is necessary to branch the electric wires W as the subjects of coating in the middle as shown in the figures.

When the nozzle L is used, the electric wires W are relatively moved with respect to the nozzle L (moved downward in FIG. 18A) to form the covering member C. The electric wires W cannot be relatively moved any more at a time point of connection between the nozzle L and a branch point of the electric wires W. Accordingly, as shown in FIG. 18A, it is impossible to coat the electric wires W from the branch point of the electric wires W by about the thickness T1 of the nozzle L.

On the other hand, also when the nozzle S is used, the electric wires W cannot be relatively moved any more at a time point of connection between the nozzle S and a branch point of the electric wires W. However, as shown in FIG. 18B, the part in which the electric wires W cannot be coated corresponds to the thickness T2 of the nozzle S from the branch point of the electric wire W. That is, in the use of the nozzle S having a relatively small thickness, it is possible to coat the electric wires W to the position closer to the branch point of the electric wires W.

That is, in the above-described wire harness manufacturing apparatus 2 according to the second embodiment of the present invention, since the nozzle 22 is thinned by forming the thermoplastic material channels 2231 and 2241 in the planar direction of the tabular body, when the electric wires are branched, it is possible to coat the electric wires to the position closer to the branch point.

Further, as described as a modification of the wire harness manufacturing apparatus 2 according to the second embodiment, in the thermoplastic material channels 2231 and 2241 branched in plural channels, it is possible to set the resistance loss values by line resistance in the respective channels to approximately uniformized values by increasing the cross-sectional area in accordance with increment in channel length. That is, it is possible to approximately uniformize the pressure values of the thermoplastic material discharged from the discharge orifices 2232 and 2242 in the circumferential direction of the electric wire, and therefore the thickness of the covering member 92 is uniform in the circumferential direction.

According to the wire harness manufacturing method according to the embodiments of the present invention, the order of attaching the connectors and the like to the ends of the electric wires 91 and molding the covering member 92 in the predetermined part of the electric wires 91 is not limited.

In the structure where a tubular member (e.g. a corrugate tube) is used as the covering member and the predetermined part of the electric wires is accommodated inside the tubular member, the order of attaching the connectors and the like to the ends of the electric wires and molding the covering member may be limited. More particularly, when the connectors and the like attached to the ends of the electric wires have sizes and shapes which cannot be inserted through the tubular member, it is necessary to insert the electric wires through the tubular member prior to the attachment of the connectors and the like to the ends of the electric wires.

When the order of these processes is limited, a problem as follows occurs. In the process of attachment of the connectors and the like to the ends of the electric wires, an automatic device may be used. However, in the state where the electric wires are inserted through the tubular member, it may be impossible to set predetermined electric wires in the automatic device due to physical interference by the tubular member and other electric wires. In such case, it is impossible to manually attach the connectors and the like. As a result, the manufacturing cost of the wire harness is increased, or it is difficult to reduce the manufacturing cost.

On the other hand, in the wire harness manufacturing method according to the embodiments of the present invention, after the predetermined connectors and the like are attached to the ends of the respective electric wire 91, the electric wires 91 are bundled and the covering member 92 is molded. Accordingly, the process of attachment of the connectors and the like to the ends of the electric wires 91 can be performed in a state where the respective electric wires 91 individually exist. Accordingly, in the process of attachment of the connectors and the like using an automatic device, there is no difficulty in setting of the electric wires 91 in the automatic device since there is no interference by other electric wires 91 and the covering member 92. Accordingly, it is possible to perform the process of attachment of the connectors and the like to the respective electric wires 91 using an automatic device and reduce the manufacturing cost.

Note that in the structure where a tube having a slit (tube having an approximate "C" cross-sectional shape) is used as the covering member, the covering member can be provided in a predetermined part of the electric wires after the process of attachment of connectors and the like to the ends of the electric wires. However, in this structure, it is necessary to wrap a tape or the like around the tube to prevent drop of the electric wires from the tube (or to prevent exposure of the electric wires from opening of the slit). Accordingly the number of process steps is increased. Further, since the tape is required, the number of parts is increased. Accordingly, the manufacturing cost is increased. Further, since the tape is wrapped around the tube, the appearance of the wire harness is bad.

On the other hand, according to the wire harness manufacturing method according to the embodiments of the present invention, the covering member 92 without slit can be integrally molded. Since it is not necessary to wrap a tape around the outer periphery of the covering member 92, the number of parts and the number of process steps are not increased (or the number of parts and the number of process steps can be reduced). Further, since it is not necessary to wrap a tape around the covering member, the appearance of the wire harness 9 according to the embodiments of the present invention is good.

Further, in the structure using a tube as the covering member, it is necessary to wrap a tape or the like over the covering member and the electric wires to prevent shift of the covering member provided in the predetermined part of the electric wires. Accordingly, the number of process steps is increased (or the number of process steps cannot be reduced). Also, a tape is required, which increases the number of parts. Further, since a tape is wrapped around, the appearance of the wire harness is bad.

On the other hand, in the wire harness manufacturing method according to the embodiments of the present invention, since a part of the molded covering member 92 is attached to the electric wire 91, the covering member 92 is not moved from the molded position. Accordingly, it is not necessary to wrap a tape over the covering member 92 and the electric wires 91. Accordingly, an increase in the number of parts and the number of process steps can be prevented (or the number of parts and the number of process steps can be reduced). Further, since it is necessary to wrap a tape around the covering member 92, the appearance of the wire harness 9 according to the embodiments of the present invention is good.

Further, according to the wire harness manufacturing method according to the embodiments of the present invention, it is possible to simply and integrally mold the covering member 92 having a thickness which changes along the axial direction (i.e., the covering member in which the strength differs).

Generally, a covering member having a predetermined function is provided on the electric wires in a predetermined part of a wire harness. For example, in a state where the wire harness is provided inside a vehicle or the like, when there is a probability of damage to the electric wires due to contact with another member or the like, a protector to guard the electric wires is provided in that position. As the protector, one of protectors having various sizes and hardness levels is appropriately provided in accordance with the level of function of protecting the electric wires. On the other hand, in a part with a low level of requirement for protection of electric wires, a covering member to bundle the electric wires is provided to prevent a state where the electric wires are unbound. In this covering member, high strength may not be required. Accordingly, as a structure in the predetermined part of the electric wires, it may be arranged such that a protector is provided in a position especially requiring protection while a tape is wrapped around the other position. In such structure, since the number of parts or the wire harness and the number of process steps are increased, the manufacturing cost is increased, or the manufacturing cost cannot be reduced without difficulty.

On the other hand, according to the wire harness manufacturing method according to the embodiments of the present invention, during molding of the covering member 92, it is possible to control the thickness of the covering member (i.e. the strength) merely by controlling one or both of the speed of relative movement between the nozzle 12 and the predetermined part of the electric wires 91 or the amount of thermoplastic material discharged from the discharge orifices 1213 and 1223 of the nozzle 12 per unit time. That is, it is possible to mold the covering member 92 having a thickness (strength) which differs along the axial direction. Accordingly, since it is not necessary to provide plural covering members, it is possible to reduce the number of process steps. Further, since it is possible to integrally mold the covering member 92 having a thickness which changes along the axial direction using the thermoplastic material, it is possible to reduce the number of parts of the wire harness.

The embodiments of the present invention have been described in detail. The present invention is not limited to the above embodiments, and various changes can be made within a range not departing from the subject matter of the present invention.

For example, in the wire harness manufacturing method according to the embodiments of the present invention, the cross-sectional shape of the covering member 92 is an approximate circular shape. However, the cross-sectional shape of the covering member 92 is not limited. The cross-sectional shape of the covering member 92 may be appropriately set in accordance with the shape and the size of a region where the predetermined part of the wire harness 9 according to the embodiments of the present invention is provided (e.g., a predetermined part inside a vehicle such as an automobile). It is possible to appropriately set the cross-sectional shape and size of the covering member 92 by appropriately setting the cross-sectional shape and size of the first nest member 123 and the second nest member 124.

What is claimed is:

1. A method for protecting a predetermined longitudinal part of a wire harness, the wire harness having a bundle of electric wires including a plurality of outer wires exposed outwardly on an outer periphery of the bundle and at least one inner wire inward of the outer wires, each of the wires having a conductor covered by a sheath, the method comprising:

enclosing at least a longitudinal section of the predetermined longitudinal part of the wire harness between plural mold components that are separable from one another along at least one plane aligned with an axis of the wire harness;

heating a thermoplastic resin material to a temperature at which the thermoplastic resin is plastic-deformable and that is lower than a fusing point of the thermoplastic resin;

discharging the thermoplastic resin material from the mold components and to the outer periphery of the predetermined part from a plurality of circumferential positions around the outer periphery of the bundle to form a tubular-shaped covering member;

directly attaching an inner peripheral surface of the tubular-shaped covering member to parts of outer peripheral surfaces of the outer wires that face outwardly from the outer periphery of the bundle of electric wires; and leaving gaps between the outer electric wires and the at least one inner wire;

wherein in formation of the tubular shape covering member by discharging the thermoplastic resin material to the outer periphery of the bundle of the electric wires, the bundle of electric wires is relatively moved in an axial direction of the bundle of electric wires with respect to a discharge part of the thermoplastic resin material;

stopping relative movement between the predetermined part of the electric wire and a nozzle of the mold;

cooling down the molded covering member by sending air to the covering member from an air blowing unit; and thereafter, cutting the molded covering member and the thermoplastic material existing in the nozzle in a position of a thermoplastic material discharge orifice of the nozzle and separating the covering member from the thermoplastic material, by moving the predetermined part of the electric wire and the nozzle relatively to each other without discharging the thermoplastic material from the thermoplastic material discharge orifice of the nozzle.

2. The wire harness manufacturing method according to claim 1, wherein a thickness of the tubular shaped covering member is made to be uniform over an entire length or changed in a middle position in the axial direction of the electric wire by controlling a discharge amount of the thermoplastic material per unit time or a speed of relative movement of the bundle of electric wires in the axial direction.

3. The wire harness manufacturing method according to claim 1, further comprising:

plasticizing the thermoplastic material of the covering member, discharging the plasticized thermoplastic material to the outer periphery of the predetermined part of the electric wire, and wherein the inner peripheral surface of the covering member and the outer periphery of the predetermined part of the electric wire are attached by plasticity of the thermoplastic material.

4. The wire harness manufacturing method according to claim 1, wherein the thermoplastic resin material forming the tubular-shaped covering member is polyester hot melt resin.

* * * * *